(12) United States Patent
Kishi

(10) Patent No.: US 7,791,778 B2
(45) Date of Patent: Sep. 7, 2010

(54) IMAGE PROCESSING APPARATUS

(75) Inventor: Kazuyoshi Kishi, Wakayama (JP)

(73) Assignee: Noritsu Koki Co., Ltd., Wakayama-shi (JP)

( * ) Notice: Subject to any disclaimer, the term of this patent is extended or adjusted under 35 U.S.C. 154(b) by 731 days.

(21) Appl. No.: 11/252,027

(22) Filed: Oct. 18, 2005

(65) Prior Publication Data

US 2006/0087700 A1 Apr. 27, 2006

(30) Foreign Application Priority Data

Oct. 21, 2004 (JP) ............................. 2004-306441

(51) Int. Cl.
*H04N 1/46* (2006.01)
(52) U.S. Cl. ...................... 358/538; 358/537; 358/540
(58) Field of Classification Search ................ 358/538, 358/1.2, 1.9, 453, 528, 449–451, 537, 540; 382/190, 256, 298; 345/660–671
See application file for complete search history.

(56) References Cited

U.S. PATENT DOCUMENTS

| | | | | |
|---|---|---|---|---|
| 5,666,471 | A * | 9/1997 | Fujii | .......................... 358/1.18 |
| 6,507,411 | B1 * | 1/2003 | Nishikawa et al. | ........... 358/1.2 |
| 6,775,403 | B1 | 8/2004 | Ban et al. | |
| 7,092,569 | B1 * | 8/2006 | Kinjo | .......................... 382/190 |
| 7,319,543 | B2 * | 1/2008 | Suzuki | ........................ 358/1.9 |
| 2002/0030634 | A1 | 3/2002 | Noda et al. | |
| 2004/0178945 | A1 * | 9/2004 | Buchanan | ..................... 342/70 |

FOREIGN PATENT DOCUMENTS

| | | | |
|---|---|---|---|
| JP | 07-038733 A | | 2/1995 |
| JP | 07038733 A | * | 2/1995 |
| JP | 11-48572 A | | 2/1999 |
| JP | 11-227287 A | | 8/1999 |
| JP | 2003-078747 A | | 3/2003 |
| JP | 2003-274135 A | | 9/2003 |
| JP | 2003-348331 A | | 12/2003 |
| JP | 2004-193933 A | | 7/2004 |

OTHER PUBLICATIONS

Japanese Notice of Reasons for Rejection, mailed Jun. 2, 2009, directed to Japanese Patent Application No. 2004-306441; 3 pages.

* cited by examiner

*Primary Examiner*—James A Thompson
(74) *Attorney, Agent, or Firm*—Smith Patent Office

(57) ABSTRACT

An image processing apparatus comprises a boundary line position storage section storing position information on boundary lines for dividing an image according to an image data unit into regions; a position information changing section to change the position information on boundary lines; and a dividing section to divide the image data unit into partial image data units corresponding to the respective regions. When a boundary line stored in the boundary line position storage section is across a principal part of the image, the position information changing section changes the position of the boundary line so as not to be across the principal part. When the regions divided by the boundary lines stored in the boundary line position storage section, includes a region that exceeds the maximum print size, the position information changing section changes the positions of boundary lines so that any region does not exceed the maximum print size.

13 Claims, 17 Drawing Sheets

IMAGE PROCESSING APPARATUS

BACKGROUND OF THE INVENTION

1. Field of the Invention

The present invention relates to an image processing apparatus having a poster print function for dividing an image into a plurality of regions and printing the respective regions of the image on sheets of paper.

2. Description of Related Art

Recently, a so-called digital exposure method is put to practical use. In the method, a photosensitive material is exposed to a light being controlled on the basis of a digital image signal obtained by picking up an image on a film with a film scanner having an image pickup device such as a CCD. By adopting such a digital exposure method, various kinds of image processing, such as color correction, density correction, and sharpness processing, can be performed with a high degree of freedom. In addition, rapid reprint processing becomes possible. Further, a higher-quality good print can be obtained that is superior in reproducibility of color and density and in resolution.

A photo processing apparatus using such a digital exposure method as described above has in its image processing unit a poster print function for dividing an image into a plurality of regions and printing each region of the image on a sheet of paper. In poster printing, the positions at which the image is divided are determined by the capacity of a memory to be used, the output paper size, and the output image size of the apparatus. As a result, a principal part of the image, for example, the face of a person, may be divided, which makes the obtained prints hard to see. In view of the problem, JP-A-2003-348331 discloses a technique in which an operator can select the optimum one of a plurality of division patterns including a plurality of basic division patterns and division patterns changeable on the basis of the basic division patterns, stored in advance.

However, such division patterns stored in advance can not always realize image division that brings about prints easy to see. Therefore, even by the prior art technique, there is a case wherein, for example, a principal part of an image is divided and consequently prints hard to see are obtained.

SUMMARY OF THE INVENTION

An object of the present invention is to provide an image processing apparatus in which images easy to see can be obtained in poster printing.

According to an aspect of the present invention, an image processing apparatus comprises a boundary line position storage section that stores therein position information on boundary lines for dividing an image according to an image data unit into a plurality of regions; a position information changing section that changes the position information on boundary lines being stored in the boundary line position storage section, such that the position of a boundary line is changed in the image; and a dividing section that divides the image data unit into a plurality of partial image data units corresponding to the respective regions.

In the present invention, "an image data unit" means "a data file on an image" or "an aggregate of data constituting image information before converted into a data file".

According to this aspect, the position information on boundary lines being stored in the boundary line position storage section can be changed by the position information changing section with a high degree of freedom. Thus, in poster printing in which an image of each region is printed on the basis of the corresponding partial image data unit, an image easy to see can be obtained.

According to another aspect of the present invention, it is preferable that the apparatus further comprises a principal part detecting section that detects a principal part of the image according to the image data unit, and the position information changing section changes the position information on boundary lines being stored in the boundary line position storage section, such that any boundary line is across the principal part detected by the principal part detecting section. According to this aspect, the principal part can be prevented from being divided into different regions. Thus, an image easy to see can surely be obtained in poster printing.

According to still another aspect of the present invention, the principal part detecting section may detect a human face as the principal part of the image. According to this aspect, the human face can be prevented from being divided into different regions. Thus, an image easy to see can surely be obtained in poster printing.

According to still another aspect of the present invention, the principal part detecting section may detect human eyes as the principal part of the image. According to this aspect, the human eyes can be prevented from being divided into different regions. Thus, an image easy to see can surely be obtained in poster printing.

According to still another aspect of the present invention, the apparatus may comprise a characteristic feature storage section that stores therein a characteristic feature of the principal part of the image according to the image data unit; and a characteristic feature rewriting section that rewrites the characteristic feature being stored in the characteristic feature storage section, on the basis of a signal from an input device. According to this aspect, an operator can rewrite the characteristic feature being stored in the characteristic feature storage section, by inputting an instruction with an input device. Thus, the operator can freely determined with his or her intention what part of an image is set at a principal part of the image.

According to still another aspect of the present invention, the position information changing section may finely adjust the position information on a boundary line being stored in the boundary line position storage section, on the basis of a signal from an input device. According to this aspect, an operator can finely adjust the position information on a boundary line by inputting an instruction with an input device. Thus, an image easier to see can be obtained in poster printing.

According to still another aspect of the present invention, the position information changing section may change the position information on boundary lines being stored in the boundary line position storage section, on the basis of a signal from an input device. According to this aspect, an operator can change the position information on boundary lines by inputting an instruction with an input device. Thus, an easy-to-see image that meets the operator's intention can be obtained in poster printing According to still another aspect of the present invention, the apparatus preferably further comprises a print necessity storage section that stores therein print necessity information on each of the plurality of partial image data units obtained by the dividing section dividing the image data unit; and a necessity information rewriting section that rewrites the print necessity information being stored in the print necessity storage section, on the basis of a signal from an input device. According to this aspect, only necessary regions of the image divided into the plurality of regions can be printed by the necessity information rewriting section rewriting the print necessity information being stored in the print necessity storage section.

According to still another aspect of the present invention, the apparatus may further comprise a print size storage section that stores therein a maximum print size for the image; an enlargement factor storage section that stores therein an enlargement factor for the image; and a size judging section that judges on the basis of the enlargement factor being stored in the enlargement factor storage section, whether or not the plurality of regions include a region that exceeds the maximum print size being stored in the print size storage section. According to this aspect, inconvenience can be prevented in which a portion of a region of the image divided into the plurality of regions can not be printed because the portion of the region is out of the maximum size.

According to still another aspect of the present invention, the print size storage section may store therein a size of a paper on which the image is to be printed. According to this aspect, inconvenience can be prevented in which a portion of a region of the image divided into the plurality of regions can not be printed because the portion of the region is out of the paper size.

According to still another aspect of the present invention, the apparatus preferably further comprises an informing signal generating section that generates an informing signal to inform an operator that a region exceeds the maximum print size being stored in the print size storage section, when the size judging section judges the region to exceed the maximum print size. According to this aspect, by the informing signal generated by the informing signal generating section, the operator can know that a region exceeds the maximum print size. Thus, the operator can change the position information on boundary lines so that any region does not exceed the maximum print size.

According to still another aspect of the present invention, the position information changing section may change the position information on boundary lines being stored in the boundary line position storage section, such that any region does not exceed the maximum print size being stored in the print size storage section, when the size judging section judges one or more regions to exceed the maximum print size. According to this aspect, because the position information changing section changes the position information on boundary lines so that any region does not exceed the maximum print size, the position information on boundary lines can efficiently be changed.

According to still another aspect of the present invention, the apparatus may further comprises a print direction storage section that stores therein a print direction for each of the plurality of regions; a print judging section that judges whether or not each of the plurality of regions can be printed in the print direction being stored in the print direction storage section for the region; and a print direction rewriting section that rewrites the print direction being stored in the print direction storage section for a region that has been judged by the print judging section to be impossible to print in the print direction being stored in the print direction storage section for the region, to a direction perpendicular to the currently stored direction. According to this aspect, inconvenience can be prevented in which a portion of a region can not be printed because the region is printed in a direction impossible to print.

According to still another aspect of the present invention, the apparatus may further comprises a print direction storage section that stores therein a print direction for each of the plurality of regions; a print direction rewriting section that rewrites a print direction being stored in the print direction storage section; and a total length judging section that judges which of the following cases brings about the shorter total length in the print direction: a case wherein a plurality of first neighboring regions in the plurality of regions, neighboring each other and common in the print direction being stored in the print direction storage section, are printed in the print direction of the first neighboring regions; and a case wherein a plurality of second neighboring regions obtained by dividing the whole of the plurality of first neighboring regions by a boundary line or lines perpendicular to the print direction being stored in the print direction storage section for the first neighboring regions, are printed in a direction perpendicular to the print direction being stored in the print direction storage section for the first neighboring regions. When the total length judging section judges the case wherein the plurality of second neighboring regions are printed in the direction perpendicular to the print direction being stored in the print direction storage section for the first neighboring regions, to bring about the shorter total length, it is preferable that the position information changing section changes the position information on boundary lines being stored in the boundary line position storage section, such that the plurality of second neighboring regions are formed in place of the plurality of first neighboring regions; and the print direction rewriting section sets the print direction for the plurality of second neighboring regions to a direction perpendicular to the print direction being stored in the print direction storage section for the first neighboring regions.

According to this aspect, the total length in the print direction can be made shorter. As a result, the quantity of use of paper can be reduced and thus the cost can be reduced

BRIEF DESCRIPTION OF THE DRAWINGS

Other and further objects, features and advantages of the invention will appear more fully from the following description taken in connection with the accompanying drawings in which.

DESCRIPTION OF THE PREFERRED EMBODIMENTS

Figure 1:
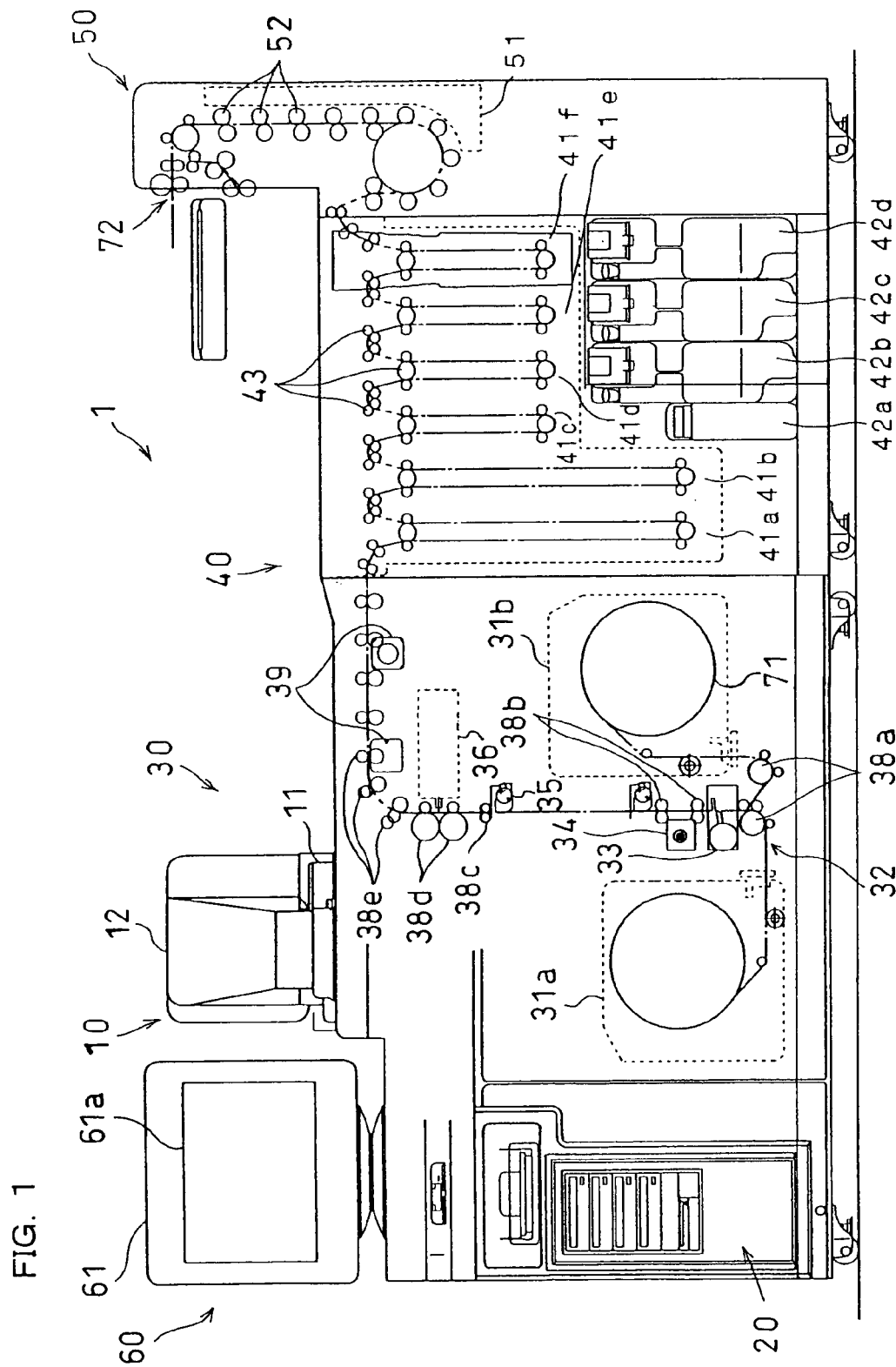
FIG. 1 is a view showing a general construction of a photo processing apparatus including therein a controller according to a first embodiment of the present invention.

Hereinafter, preferred embodiments of the present invention will be described with reference to drawings. FIG. 1 is a view showing a general construction of a photo processing apparatus including therein a controller according to a first embodiment of the present invention.

As shown in FIG. 1, the photo processing apparatus 1 of this embodiment includes a scanner 10, a controller 20, a printer 30, a processor 40, a finishing unit 50, and an interface unit 60.

The scanner 10 mainly performs processing of picking up an image recorded on a frame of a developed photographic film. The scanner 10 includes a film mounting unit 11 on which a film is mounted; and a scanner light source unit 12 including therein a light source for irradiating the film being scanned. Although not shown in FIG. 1, an image pickup device such as a CCD is linearly disposed under the film mounting unit 11. An image signal output from the image pickup device is converted into a digital signal by a not-shown A/D converter, and then supplied as an image data file to the controller 20.

Figure 2:
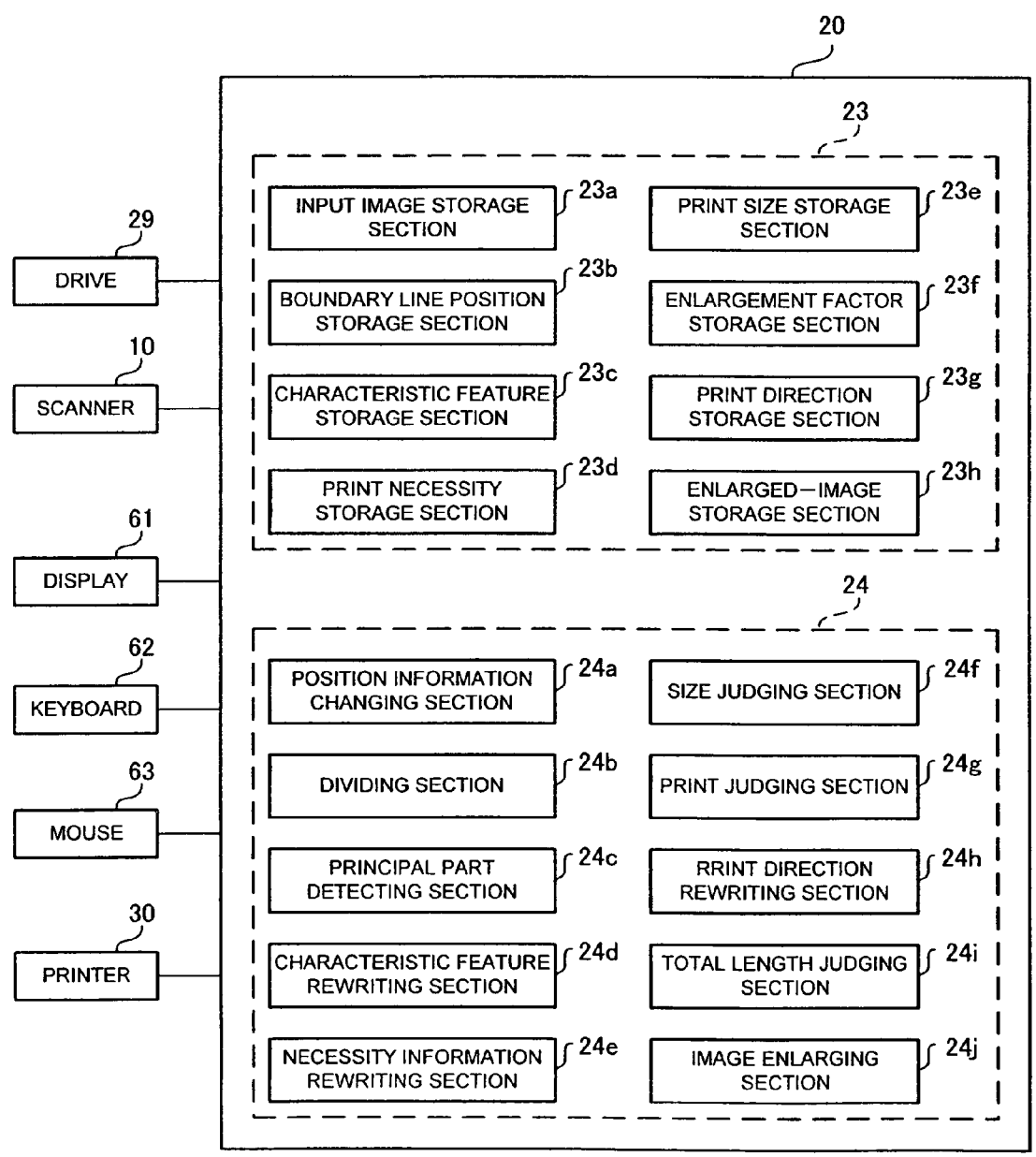
FIG. 2 is a block diagram showing a general constitution of the controller shown in FIG. 1.

As shown in FIG. 2, the controller 20 includes therein a storage unit 23 and a poster print control unit 24. The controller 20 is provided with a drive 29 for reading out data from and writing data on various kinds of recording media such as a CD-R, which is a compact disc once recordable, and an FD. The controller 20 can acquire an image data file from such a recording medium through the drive 29.

The storage unit 23 includes therein an input image storage section 23a, a boundary line position storage section 23b, a characteristic feature storage section 23c, a print necessity storage section 23d, a print size storage section 23e, an enlargement factor storage section 23f, a print direction storage section 23g, and an enlarged-image storage section 23h.

The input image storage section 23a stores therein an image data file acquired through the scanner 10 or the drive 29. The boundary line position storage section 23b stores therein position information on boundary lines for dividing an image according to the image data file being stored in the input image storage section 23a, into a plurality of regions. Hereinafter, such an image will be simply referred to as an input image. The position information can be changed by a position information changing section 24a, which will be described later. An input image divided into a plurality of regions by boundary lines stored in the boundary line position storage section 23b, is displayed on a display 61, which will be described later.

The characteristic feature storage section 23c stores therein a characteristic feature of a principal part of an input image. In this embodiment, characteristic features of faces and eyes of humans as principal parts are stored in advance in the characteristic feature storage section 23c. The characteristic features of the principal parts can be rewritten by a characteristic feature rewriting section 24d, which will be described later. The print necessity storage section 23d stores therein print necessity information on each of a plurality of partial image data files obtained by dividing an image data file being stored in the input image storage section 23a, by a dividing section 24b, which will be described later. In this embodiment, the print necessity information initially stored indicates that all partial image data files must be printed. If a partial image data file exists that need not be printed, an operator can rewrite the print necessity information through a necessity information rewriting section 24e, which will be described later.

The print size storage section 23e stores therein the maximum print size on printing one region of an input image. In this embodiment, because each image is printed on a long printing paper 71 wound on a roll and taken out from the roll, as will be described later, the maximum print width as the maximum size perpendicular to the conveyance direction of the printing paper 71, that is, the print direction, when one region is printed, is equal to the length of the printing paper 71 perpendicular to the conveyance direction, that is, the width of the printing paper 71. On the other hand, the maximum print length as the maximum size in the conveyance direction is determined by the capacity of the enlarged-image storage section 23h. The maximum print length is larger than the maximum print width. The enlargement factor storage section 23f stores therein an enlargement factor for an input image, input by an operator with an instruction input device such as a keyboard 62 or a mouse 63, which will be described later. In this embodiment, the longitudinal enlargement factor and the lateral enlargement factor for the input image are equal to each other.

The print direction storage section 23g stores therein a print direction for each of a plurality of regions divided by boundary lines stored in the boundary line position storage section 23b. The print direction can be written through a print direction rewriting section 24h, which will be described later. The enlarged-image storage section 23h stores therein an image data file of an input image enlarged by an image enlarging section 24j, which will be described later. The enlarged-image storage section 23h stores therein the image data file corresponding to one region. On the basis of the image data file stored in the enlarged-image storage section 23h, the printer 30 prints an image corresponding to one region.

The poster print control unit 24 includes therein a position information changing section 24a, a dividing section 24b, a principal part detecting section 24c, a characteristic feature rewriting section 24d, a necessity information rewriting section 24e, a size judging section 24f, a print judging section 24g, a print direction rewriting section 24h, a total length judging section 24i, and an image enlarging section 24j.

The position information changing section 24a can change the position information on boundary lines for an input image divided into a plurality of regions, being stored in the above-described boundary line position storage section 23b. More specifically, the position information changing section 24a changes the position information on boundary lines such that any boundary line is across a principal part of the image detected by the principal part detecting unit 24c. In addition, if the size judging section 24f has judged one or more regions to exceed the maximum print size, as will be described in detail, the position information changing section 24a changes the position information on boundary lines such that any region does not exceed the maximum print size. Further, when an operator checks the input image divided into a plurality of regions and being displayed on a display 61, which will be described later, and changes the position of a boundary line with an instruction input device, the position information changing section 24a changes the position information on boundary lines accordingly.

The dividing section 24b divides an image data file being stored in the input image storage section 23a, into a plurality of partial image data files so as to correspond to a plurality of regions divided by boundary lines being stored in the boundary line position storage section 23b, respectively.

The principal part detecting section 24c detects a principal part of an input image on the basis of the characteristic feature of the principal part being stored in the above-described characteristic feature storage section 23c. As described above, the characteristic feature storage section 23c of this embodiment stores therein characteristic features of faces and eyes of humans as principal parts in advance. Thus, the principal part detecting section 24c can detect the face and eyes of a human. In this embodiment, the principal part detecting section 24c first detects the face of a human. If the size of the detected face enlarged according to the enlargement factor being stored in the enlargement factor storage section 23f exceeds the maximum print size, then the principal part detecting section 24c further detects the eyes of the human. The characteristic feature rewriting section 24d can rewrite the characteristic features of the principal parts being stored in the above-described characteristic feature storage section 23c, on the basis of an instruction for rewriting, input by an operator with an instruction input device.

The necessity information rewriting section 24e can rewrite the print necessity information being stored in the above-described print necessity storage section 23d. More specifically, if an operator who is checking an input image divided into a plurality of regions and being displayed on a display 61, which will be described later, finds a region that need not be printed, he or she inputs with an instruction input device an instruction to cancel the printing operation for the region. In this case, on the basis of the instruction of the operator, the necessity information rewriting section 24e rewrites the print necessity information such that the partial image data file corresponding to the region that need not be printed, is not printed.

The size judging section 24f judges whether or not the regions of an input image enlarged on the basis of the enlargement factor being stored in the above-described enlargement factor storage section 23f, includes a region that exceeds the maximum print size being stored in the above-described print size storage section 23e.

The print judging section 24g judges whether or not each of a plurality of regions of the input image can be printed in the print direction being stored in the above-described print direction storage section 23g. More specifically, if the length of each region perpendicular to the print direction being stored in the print direction storage section 23g, exceeds the width of the printing paper 71 as the maximum print width, the region is judged to be impossible to print. As for the region having been judged by the above-described print judging section 24g to be impossible to print, the print direction rewriting section 24h rewrites the print direction being stored in the above-described print direction storage section 23g, to a direction perpendicular to the currently stored direction.

The total length judging section 24i judges which of the following cases brings about the shorter total length in the print direction: a case wherein a plurality of first neighboring regions neighboring each other and common in the print direction being stored in the above-described print direction storage section 23g, of the regions except the region including therein a principal part, which is the face of a human when the size of the enlarged face does not exceed the maximum print size, or the eyes of the human when the size of the enlarged face exceeds the maximum print size, in a plurality of regions of an input image, are printed in the print direction of the first neighboring regions; and a case wherein a plurality of second neighboring regions obtained by dividing the whole of the plurality of first neighboring regions by boundary lines perpendicular to the print direction of the first neighboring regions, are printed in a direction perpendicular to the print direction of the first neighboring regions.

The image enlarging section 24j enlarges an image on the basis of the enlargement factor being stored in the above-described enlargement factor storage section 23f. More specifically, according to an interpolation technique, the image enlarging section 24j calculates pixels that are necessary for enlarging the image and do not exist in the original image. In this embodiment, interpolation is realized by using a three-dimensional function from surrounding sixteen pixels.

Referring back to FIG. 1, in the printer 30, exposure processing is applied to a printing paper 71 as a photosensitive material on the basis of the image data file being stored in the enlarged-image storage section 23h. The printer 30 includes therein two paper magazines 31a and 31b each housing a wound long printing paper 71; an advance unit 32 for taking out the printing papers 71 from the paper magazines 31a and 31b; a cutter 33 for laterally cutting the printing paper 71 having a predetermined width and taken out from the paper magazine 31a or 31b, into a predetermined length corresponding to a print size; a printing unit 34 for printing desired information, such as position information on boundary lines, on the back face of each printing paper 71 on which no sensitive emulsion layer is formed; a chucker 35 for conveying printing papers 71, each of which was cut into the predetermined length, in parallel in two or three rows to a prestage of an exposure position; an exposure unit 36 for applying exposure processing to each printing paper 71; a plurality of conveyance roller pairs 38a to 38e for conveying the printing papers 71; and motors 39 for driving the conveyance roller pairs 38a to 38e.

In the processor 40, predetermined kinds of processing, such as development, bleaching/fixing, and stabilization, are applied to each printing paper 71, which has been subjected to exposure processing. The processor 40 includes therein processing baths 41a to 41f for applying the kinds of processing, such as development, bleaching/fixing, and stabilization, to each printing paper 71 fed from the printer 30; tanks 42a to 42d for waste liquids and replenishing liquids for the processing liquids being stored in the processing baths 41a to 41f; a plurality of roller pairs 43 for conveying each printing paper 71; and a not-shown motor for driving the roller pairs 43.

In the finishing unit 50, dry processing is applied to each printing paper 71, on which an image has been made visible, discharged from the processor 40. Further, printing papers 71 discharged through a discharge port 72 are sorted in accordance with orders. The finishing unit 50 includes therein a heater 51 for rapidly drying each printing paper 71 discharged from the processor 40; a plurality of roller pairs 52 for conveying the printing paper 71; and a not-shown motor for driving the roller pairs 52. Each printing paper 71 is conveyed by the roller pairs 52 and discharged as a finished print through the discharge port 72.

The interface unit 60 is for exchange information between the photo processing apparatus 1 and an operator who is operating the apparatus. The interface unit 60 includes a display 61 for displaying on its display screen 61*a* various kinds of information on the photo processing apparatus 1; and instruction input devices such as a keyboard 62 and a mouse 63, as shown in FIG. 2, for the operator giving an instruction to the photo processing apparatus 1.

Figure 3A:
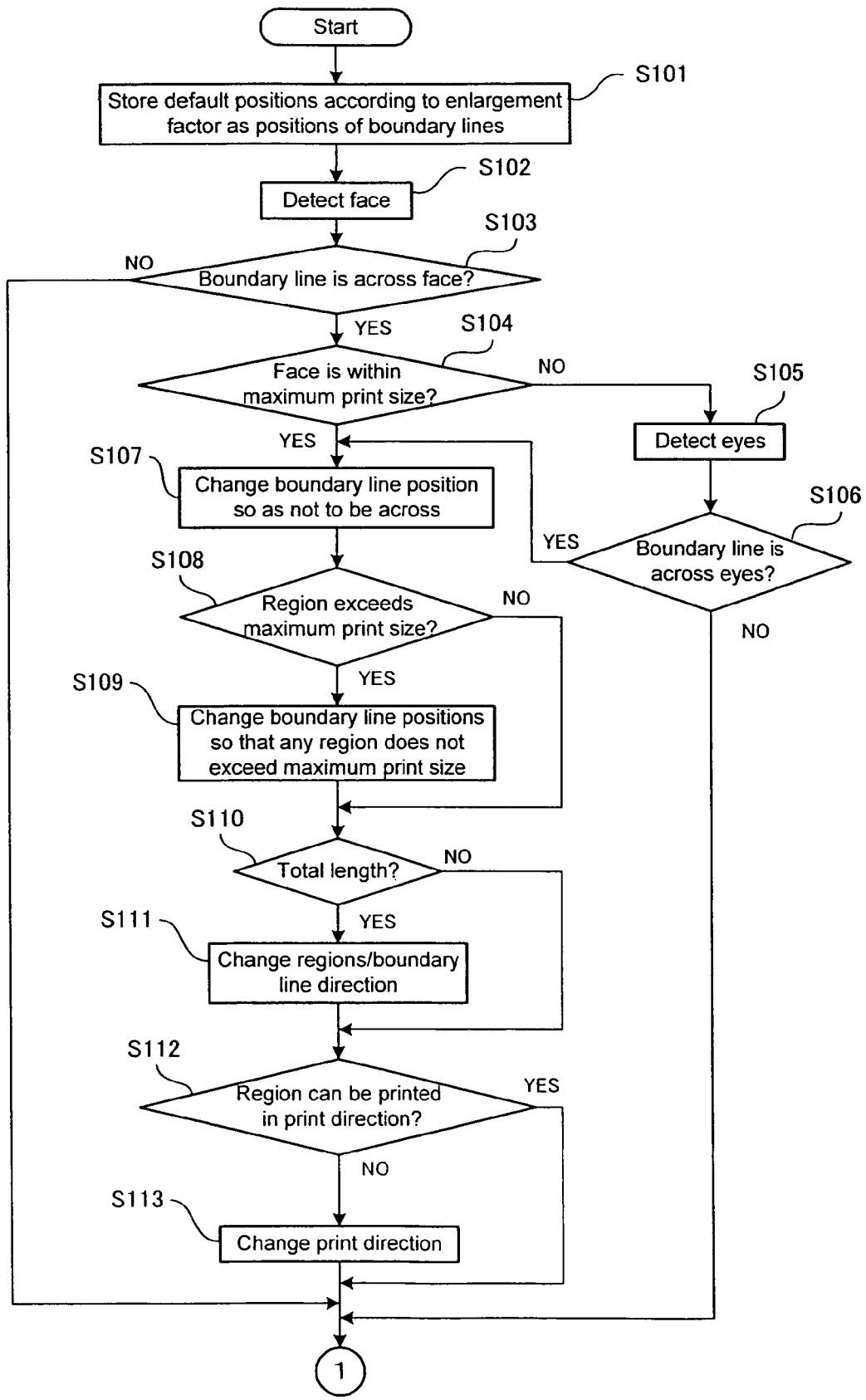
FIG. 3A is a flowchart showing the first half of a procedure of poster printing by the controller shown in FIG. 1.
Figure 3B:
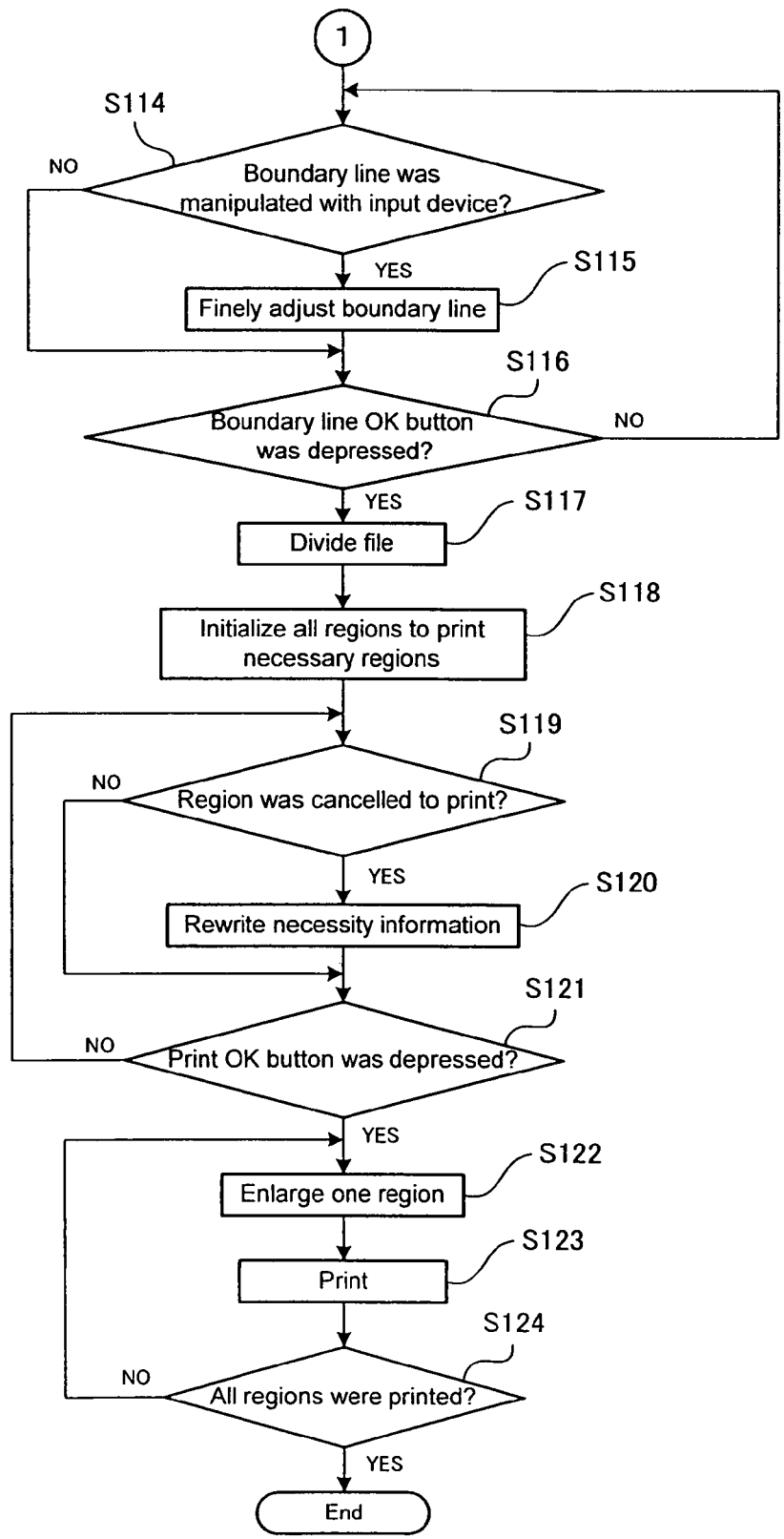
FIG. 3B is a flowchart showing the second half of the procedure of poster printing by the controller shown in FIG. 1.
Figure 4:
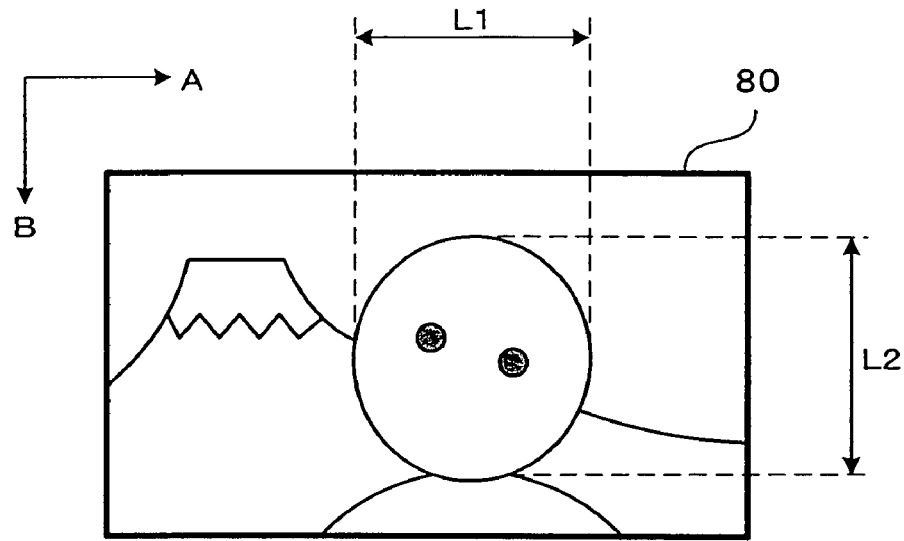
FIG. 4 shows an example of an image to be processed by the photo processing apparatus of FIG. 1.

Next, a procedure of poster printing will be described. FIGS. 3A and 3B are flowcharts showing the procedure of poster printing. In this embodiment, a case will be described wherein an image 80 as shown in FIG. 4 according to an image data file supplied from the drive 29 or the scanner 10 and being stored in the input image storage section 23*a* is enlarged in accordance with the enlargement factor being stored in the enlargement factor storage section 23*f*, and then poster printing is carried out.

Figure 5:
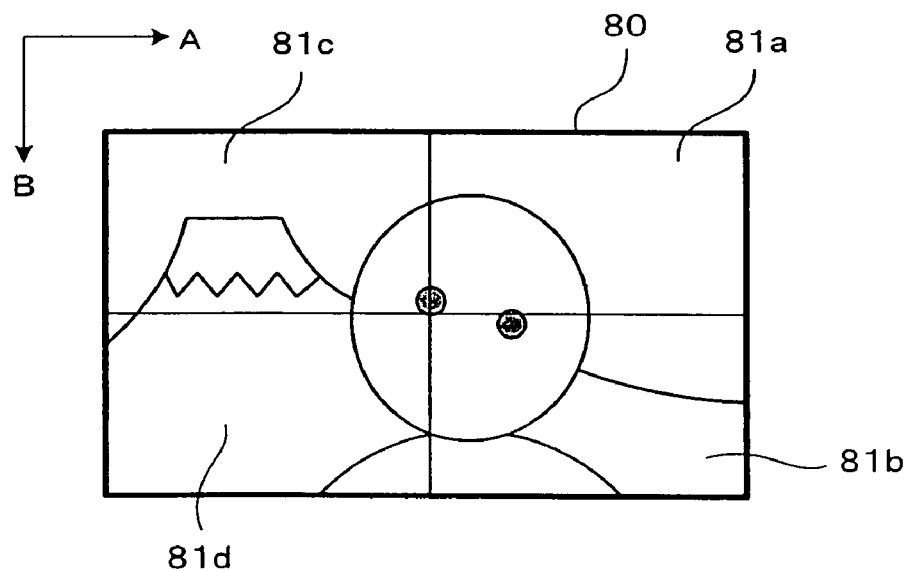
FIG. 5 shows a state wherein the image of FIG. 4 is divided by boundary lines being at their default positions.

First, in Step S101, the default positions according to the enlargement factor being stored in the enlargement factor storage section 23*f* are stored in the boundary line position storage section 23*b* as position information on boundary lines. In this step of this embodiment, position information on boundary lines is stored that causes the image 80 to be divided into four regions 81*a* to 81*d* corresponding to respective upper right, lower right, upper left, and lower left portions of the image, as shown in FIG. 5. Next, in Step S102, the principal part detecting section 24*c* detects the position of the face of a human from the image 80 on the basis of the characteristic feature of a human face being stored in the characteristic feature storage section 23*c*. In step S103, it is judged whether or not a boundary line dividing the image 80 is across the face detected in Step S102.

When any boundary line is not across the face, that is, No in Step S103, the flow then skips the procedure of Steps S104 to S113, which will be described below, and advances to Step S114. On the other hand, when one or more boundary lines are across the face as shown in FIG. 5, that is, Yes in Step S103, it is then judged in Step S104 whether or not the size of the face detected in Step S102, enlarged according to the enlargement factor being stored in the enlargement factor storage section 23*f*, is within the maximum print size. When the enlarged size of the face is within the maximum print size, that is, Yes in Step S104, the position information changing section 24*a* then changes in Step S107 the position information being stored in the boundary line position storage section 23*b*, such that any boundary line is not across the face.

On the other hand, when the enlarged size of the face is not within the maximum print size, that is, No in Step S104, the principal part detecting section 24*c* then detects in Step S105 the position of the eyes of the human from the image 80 on the basis of the characteristic feature of human eyes being stored in the characteristic feature storage section 23*c*. In the present example, either of the length enlarged from the horizontal length L1, which is the length in a direction shown by an arrow A, of the face in the image 80 shown in FIG. 4 and the length enlarged from the vertical length L2, which is the length in a direction shown in an arrow B, of the face, is longer than the maximum print width. Therefore, the enlarged size of the face in the image 80 is not within the maximum print size. Thus, the position of the eyes is detected in Step S105.

Subsequently, in Step S106, it is judged whether or not a boundary line is across the eyes detected in Step S105. When any boundary line is not across the eyes, that is, No in Step S106, the flow then skips Steps S107 to S113, which will be described below, and advances to Step S114. On the other hand, when one or more boundary lines are across the eyes as shown in FIG. 5, that is, Yes in Step S106, the position information changing section 24*a* then changes in Step S107 the position information being stored in the boundary line position storage section 23*b*, such that any boundary line is not across the eyes.

Figure 6:
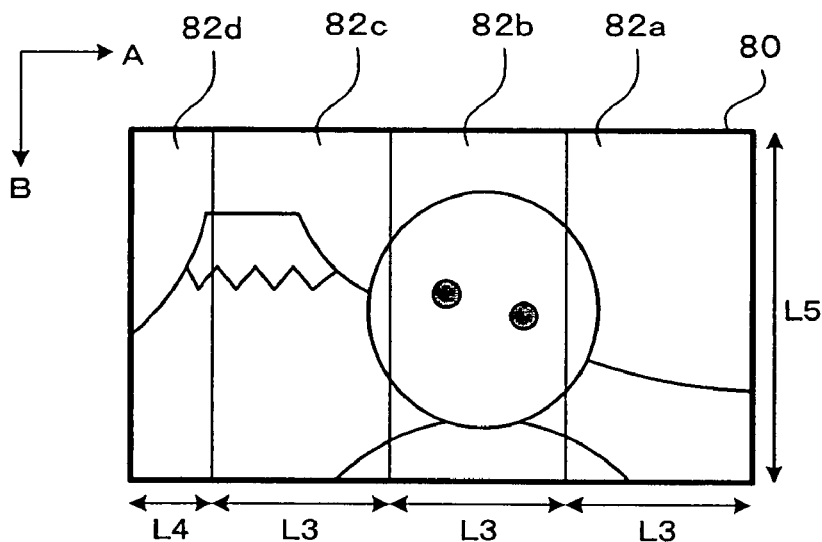
FIG. 6 shows a state wherein the positions of boundary lines for the image of FIG. 5 have been changed such that any boundary line is not across a principal part of the image.

In the present example, the boundary lines dividing the image 80 of this embodiment are changed as shown in FIG. 6, and thereby the image 80 is divided into four regions 82*a* to 82*d* neighboring each other in the direction of the arrow A. Of the regions 82*a* to 82*d*, the length enlarged from the length L3, in the direction of the arrow A, of each of right three regions 82*a* to 82*c* in FIG. 6, is substantially equal to the maximum print width. On the other hand, the length enlarged from the length L4, in the direction of the arrow A, of the leftmost region 82*d* in FIG. 6, is about half the maximum print width. The length enlarged from the length L5, in the direction of the arrow B, of each of the regions 82*a* to 82*d*, is shorter than the maximum print length. The lengths L3, L4, and L5 have a relation as shown by the following equation 1:

$$L3:L4:L5 = 1:0.5:2 \qquad \text{(Equation 1)}$$

As described above, in Step S107, the position information on boundary lines are changed such that any boundary line is not across the face, when the enlarged size of the face is judged in Step S104 to be within the maximum print size; and the position information on boundary lines are changed such that any boundary line is not across the eyes, when the enlarged size of the face is judged in Step S104 not to be within the maximum print size, and one or more boundary lines are judged in Step S106 to be across the eyes.

Afterward, in Step S108, the size judging section 24*f* judges whether or not the size of each of four regions 82*a* to 82*d* shown in FIG. 6 enlarged on the basis of the enlargement factor being stored in the enlargement factor storage section 23*f*, exceeds the maximum print size. When any of the regions 82*a* to 82*d* does not exceed the maximum print size, that is, No in Step S108, the flow then skips Step S109, which will be described below, and advances to Step S110. On the other hand, when one or more of the regions 82*a* to 82*d* exceed the maximum print size, that is, Yes in Step S108, the position information changing section 24*a* then changes in Step S109 the position information being stored in the boundary line position storage section 23*b*, such that any region does not exceed the maximum print size. In the present example, any of the enlarged sizes of four regions 82*a* to 82*d* shown in FIG. 6 does not exceed the maximum print size, as described above. Thus, Step S109 is skipped.

At this time, print direction information is stored in the print direction storage section 23*g* such that each of the regions 82*a* to 82*d* is printed in the direction of the arrow B.

Figure 7:
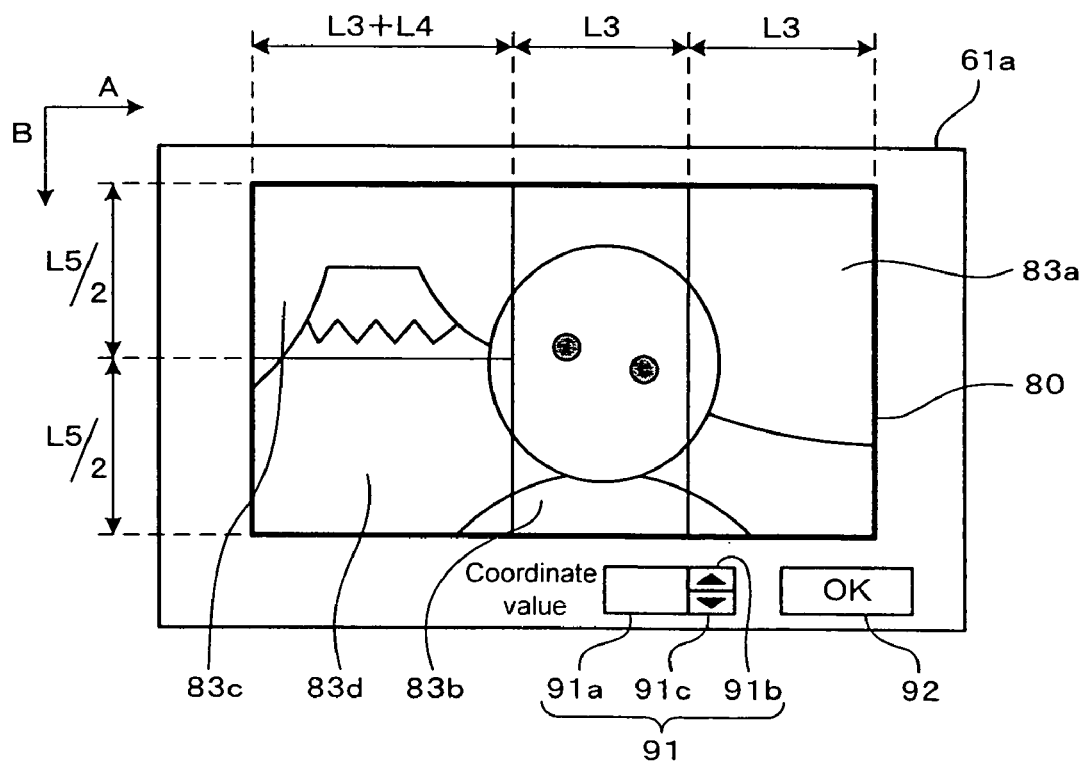
FIG. 7 shows a state wherein the positions of boundary lines for the image of FIG. 6 have been changed such that the total length in a print direction becomes shorter, and the divided image is being displayed on a display screen.

Next, in Step S110, the total length judging section 24*i* judges whether or not the total length in the print direction in the case that the regions 82*c* and 82*d* neighboring each other and common in the print direction being stored in the above-described print direction storage section 23*g*, of the regions 82*a*, 82*c*, and 82*d* except the region 82*b* including therein the eyes as a principal part, in four regions 82*a* to 82*d* of the image 80 shown in FIG. 6, are printed in the direction of the arrow B, is longer than the total length in the print direction in the case that two regions 83c and 83d neighboring each other in the direction of the arrow B in a left portion of FIG. 7, obtained by dividing the whole of two regions 82c and 82d by a boundary line extending in the direction of the arrow A perpendicular to the direction of the arrow B, are printed in the direction of the arrow A.

When the total length in the print direction in the case that the regions 82c and 82d as shown in FIG. 6 are printed in the direction of the arrow B, is not longer than the total length in the print direction in the case that the regions 83c and 83d as shown in FIG. 7 are printed in the direction of the arrow A, that is, No in Step S110, the flow then skips Step S111, which will be described below, and advances to Step S112. On the other hand, when the total length in the print direction in the case that the regions 82c and 82d as shown in FIG. 6 are printed in the direction of the arrow B, is longer than the total length in the print direction in the case that the regions 83c and 83d as shown in FIG. 7 are printed in the direction of the arrow A, that is, Yes in Step S110, the position information changing section 24a then changes in Step S111 the position information on boundary lines being stored in the boundary line position storage section 23b, to the state as shown in FIG. 7 so that the total length in the print direction becomes shorter. In addition, the print direction changing section 24h sets the print direction for the regions 83c and 83d to the direction of the arrow A.

In the present example, either of the regions 82c and 82d shown in FIG. 6 has its length of L5 in the direction of the arrow B as the print direction for the regions. Thus, the total length of them is 2×L5. On the other hand, either of the regions 83c and 83d shown in FIG. 7 has its length of (L3+L4) in the direction of the arrow A as the print direction for the regions. Thus, the total length of them is 2×(L3+L4). Therefore, the total length in the print direction can be judged by comparing the total length 2×L5 of the regions 82c and 82d in the direction of the arrow B with the total length 2×(L3+L4) of the regions 83c and 83d in the direction of the arrow A. From the relation of Equation 1, 2×L5 is larger than 2×(L3+L4). That is, in the present example, the total length in the print direction in the case that the regions 82c and 82d shown in FIG. 6 are printed in the direction of the arrow B, is longer than the total length in the print direction in the case that the regions 83c and 83d shown in FIG. 7 are printed in the direction of the arrow A. Thus, the boundary lines are changed as shown in FIG. 7.

Next, in Step S112, the print judging section 24g judges whether or not each of four regions 83a to 83d of the image 80 as shown in FIG. 7 can be printed in the print direction being stored in the print direction storage section 23g. When any of the regions 83a to 83d can be printed in the print direction, that is, Yes in Step S112, the flow then skips Step S113, which will be described below, and advances to Step S114. On the other hand, when one or more of the regions 83a to 83d can not be printed in the print direction, that is, No in Step S112, the print direction rewriting section 24h then rewrites in Step S113 the print direction for the regions impossible to print, being stored in the print direction storage section 23g, to a direction perpendicular to the currently stored direction.

In the present example, either of the length enlarged from the length L3 of each of the regions 83a and 83b of FIG. 7 in the direction of the arrow A as a direction perpendicular to the print direction for the regions 83a and 83b, and the length enlarged from the length L5/2 of each of the regions 83c and 83d in the direction of the arrow B as a direction perpendicular to the print direction for the regions 83c and 83d, does not exceed the maximum print width. Thus, Step S113 is skipped.

At this time, as shown in FIG. 7, the display 61 is displaying on its display screen 61a the image 80 divided into four regions 83a to 83d by the boundary lines determined as described above; a coordinate change unit 91 including a coordinate display portion 91a, an increment button 91b for increasing a numerical value being displayed in the coordinate display portion 91a, and a decrement button 91c for decreasing a numerical value being displayed in the coordinate display portion 91a; and an OK button 92. An operator can check the image 80 being displayed on the display screen 61a shown in FIG. 7, and he or she can finely adjust the position of each boundary line at need. More specifically, the operator can drag and move with the mouse 63 a boundary line being displayed on the display screen 61a to change the position of the boundary line. In addition, when the operator selects with the mouse 63 a boundary line being displayed on the display screen 61a, a coordinate value of the boundary line, that is, the coordinate value in the B direction in the case of the boundary line extending in the A direction or the coordinate value in the A direction in the case of the boundary line extending in the B direction, is displayed in the coordinate display portion 91a. Therefore, the operator can change the value being displayed in the coordinate display portion 91a, into a numerical value input with the keyboard 62, or by clicking the increment button 91b or the decrement button 91c with the mouse 63.

Therefore, after Step S113, it is judged in Step S114 whether or not the operator has manipulated the position of a boundary line with the keyboard 62 or the mouse 63. When the operator has not manipulated the position of any boundary line, that is, No in Step S114, the flow then skips Step S115, which will be described below, and advances to Step S116. On the other hand, when the operator has manipulated the position of a boundary line, that is, Yes in Step S114, the position information changing section 24a then changes in Step S115 the position information on the boundary line being stored in the boundary line position storage section 23b, on the basis of the instruction of the operator.

Next, in Step S116, it is judged whether or not the operator has depressed the OK button 92 to determine the positions of the boundary lines dividing the image 80 being displayed on the display screen 61a. When the OK button 92 has not yet been depressed, that is, No in Step S116, the flow then returns to Step S114, in which it is again judged whether or not the operator has manipulated the position of a boundary line. On the other hand, when the OK button 92 has been depressed, that is, Yes in Step S116, the dividing section 24b then divides in Step S117 the image data file of the image 80 being stored in the input image storage section 23a, into four partial image data files corresponding to the respective regions 83a to 83d being displayed on the display screen 61a.

Figure 8:
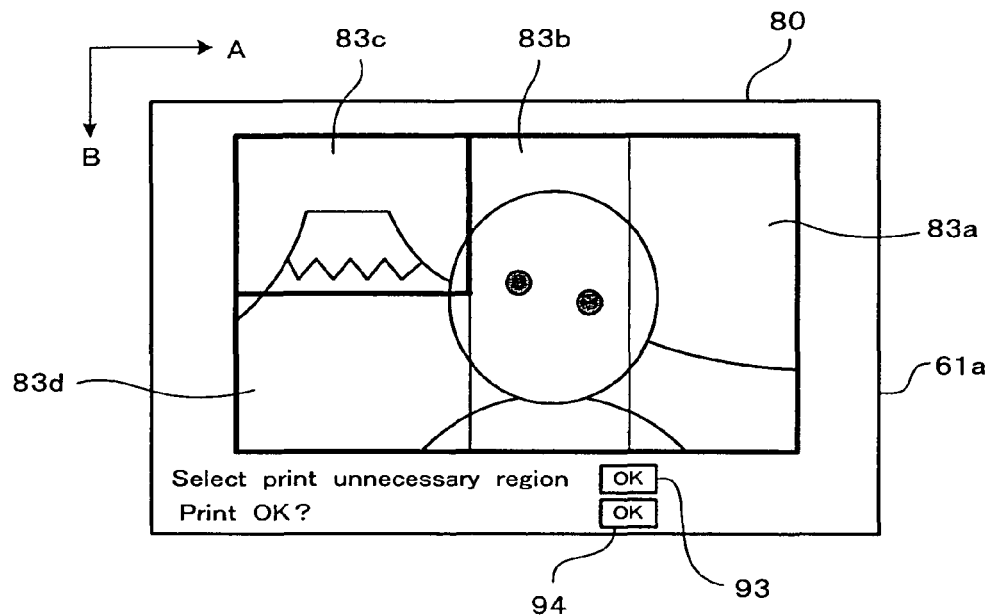
FIG. 8 shows a state wherein a region that need not be printed is selected out of four regions shown in FIG. 7.

Next, in Step S118, print necessity information is stored in the print necessity storage section 23d such that all the above four partial image data files are printed. That is, all the regions 83a to 83d of the image 80 being displayed on the display screen 61a are set to necessary print regions. At this time, as shown in FIG. 8, the display screen 61a is displaying thereon the image 80 being divided by the boundary lines determined in Step S116; an unnecessary region OK button 93 for determining a region that need not be printed; and a print OK button 94 for determining the print necessity of all regions being displayed. If the operator who is checking the image 80 being displayed on the display screen 61a, finds a region that need not be printed, he or she can input an instruction to cancel the printing operation for the region. More specifically, for example, if the region 83c need not be printed, as shown in FIG. 8, the operator selects the region 83c on the display screen 61a with the mouse 63, and then depresses the unnecessary region OK button 93.

Therefore, after Step S118, it is judged in Step S119 whether or not the operator has cancelled with the mouse 63 or the like the printing operation for a region. When any region is judged not to have been cancelled to print, that is, No in Step S119, the flow then skips Step S120, which will be described below, and advances to Step S121. On the other hand, when a region is judged to have been cancelled to print, that is, Yes in Step S119, the necessity information rewriting section 24e then rewrites in Step S120 the print necessity information being stored in the print necessity storage section 23d, on the basis of the operator's instruction to cancel the printing operation, so that the partial image data file corresponding to the region that need not be printed is not printed. Afterward, in Step S121, it is judged whether or not the operator who selected all regions that need not be printed, has depressed the print OK button 94.

When the print OK button 94 is judged not to have been depressed by the operator, that is, No in Step S121, the flow then returns to Step S119, in which it is again judged whether or not the operator has cancelled the printing operation for a region. On the other hand, when the print OK button 94 is judged to have been depressed, that is, Yes in Step S121, the image enlarging section 24j then enlarges in Step S122 one region of the image on the basis of the enlargement factor being stored in the enlargement factor storage section 23f. A partial image data file corresponding to the enlarged image of the region is then stored in the enlarged-image storage section 23h. Afterward, in Step S123, the printer 30 prints an image on the basis of the image data file being stored in the enlarged-image storage section 23h. Further, in Step S124, it is judged whether or not all the print necessary regions of the image 80 have been printed. When the printing operation is judged not to be completed for all the regions, that is, No in Step S124, the flow then returns to Step S122, in which a region that has not yet been printed is enlarged. On the other hand, when the printing operation is judged to be completed, that is, Yes in Step S124, the procedure of poster printing for the image 80 then ends.

Figure 9:
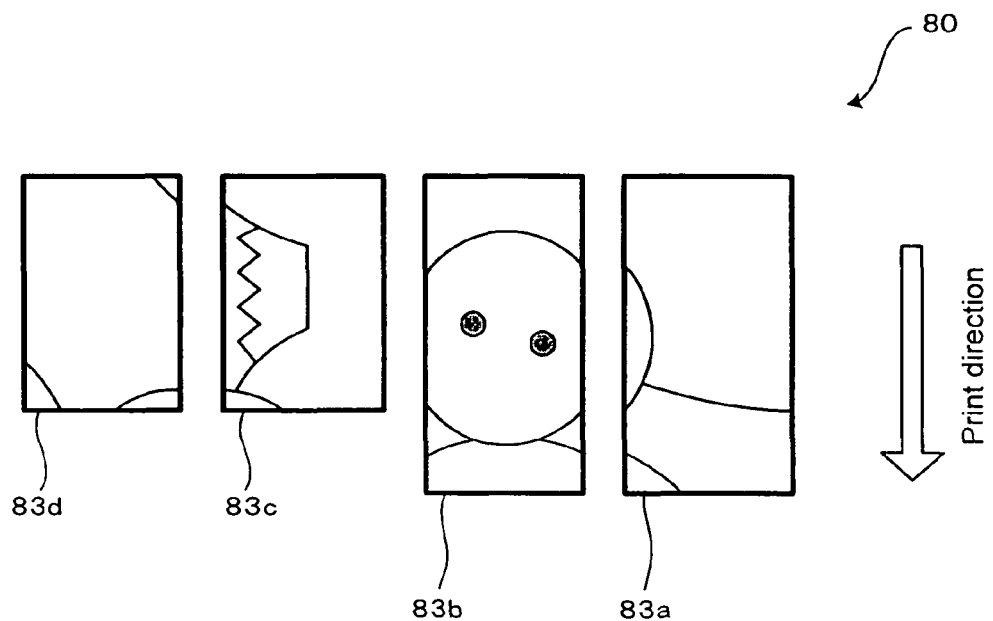
FIG. 9 shows a state wherein images obtained by dividing the original image into four regions shown in FIG. 7 have been printed on four sheets of paper, respectively.

As shown in FIG. 9, the image 80 having been subjected to poster printing of the above-described procedure is printed in a state wherein four regions 83a to 83d of the image are printed on four separate sheets of paper, respectively.

As described above, the controller 20 according to this embodiment includes the boundary line position storage section 23b that stores therein position information on boundary lines for dividing the image 80 into a plurality of regions; the position information changing section 24a that changes the position information on boundary lines being stored in the boundary line position storage section 23b, so that the position of a boundary line is changed in the image 80; and the dividing section 24b that divides the image data file of the image 80 into a plurality of partial image data files corresponding to the respective regions. Therefore, the position information on boundary lines can be changed with a high degree of freedom by the position information changing section 24a. As a result, an image easy to see can be obtained in poster printing.

The controller 20 according to this embodiment further includes the principal part detecting section 24c that detects the face and eyes of a human as principal parts of the image 80. The position information changing section 24a changes the position information on boundary lines being stored in the boundary line position storage section 23b, such that any boundary line is not across the face or eyes of the human detected by the principal part detecting section 24c. Therefore, the face or eyes of the human as a principal part is prevented from being divided into different regions. As a result, an image easy to see can surely be obtained in poster printing.

The controller 20 according to this embodiment further includes the characteristic feature rewriting section 24d that can rewrite the characteristic feature of a principal part being stored in the characteristic feature storage section 23c. Therefore, in accordance with intention of an operator, it can be arbitrarily determined what part of an image is set to a principal part.

In the controller 20 according to this embodiment, the position information changing section 24a can finely adjust the position information on a boundary line being stored in the boundary line position storage section 23b, on the basis of an instruction input by an operator. Therefore, an image easier to see can be obtained in poster printing.

The controller 20 according to this embodiment further includes the print necessity storage section 23d that stores therein print necessity information on each of a plurality of partial image data files; and the necessity information rewriting section 24e that rewrites the print necessity information being stored in the print necessity storage section 23d, on the basis of an instruction to cancel a printing operation, input by an operator. Therefore, only necessary regions of a plurality of regions of the image 80 can be printed.

The controller 20 according to this embodiment further includes the print size storage section 23e that stores therein the maximum print size in printing one region of an input image, determined by the width of a printing paper and the capacity of the enlarged-image storage section 23h; the enlargement factor storage section 23f that stores therein an enlargement factor for an input image; and the size judging section 24f that judges whether or not a plurality of regions enlarged according to the enlargement factor being stored in the enlargement factor storage section 23f includes a region that exceeds the maximum print size. Therefore, when one region is printed, inconvenience can be prevented in which a portion of the region can not be printed because the portion is out of the maximum size.

In the controller 20 according to this embodiment, when the size judging section 24f has judged one or more regions to exceed the maximum print size, the position information changing section 24a changes the position information so that any region does not exceed the maximum print size. Therefore, the position information on boundary lines can efficiently be changed such that any region does not exceed the maximum print size.

The controller 20 according to this embodiment further includes the print direction storage section 23g that stores therein the print direction for each of a plurality of regions; the print judging section 24g that judges whether or not each of a plurality of regions of an input image can be printed in the print direction being stored in the print direction storage section 23g for the region; and the print direction rewriting section 24h that rewrites the print direction being stored in the print direction storage section 23g for the region having been judged by the print judging section 24g to be impossible to print, into a direction perpendicular to the currently stored direction. This can prevent inconvenience in which a portion of a region can not be printed because the region is printed in a direction impossible to print.

The controller 20 according to this embodiment further includes the total length judging section 24i that judges which of the following cases brings about the shorter total length in the print direction: a case wherein a plurality of first neighboring regions neighboring each other and common in the print direction being stored in the print direction storage section 23g, of the regions except the region including therein a principal part, in a plurality of regions of an input image, are printed in the print direction of the first neighboring regions; and a case wherein a plurality of second neighboring regions obtained by dividing the whole of the plurality of first neighboring regions by boundary lines perpendicular to the print direction of the first neighboring regions, are printed in a direction perpendicular to the print direction of the first neighboring regions. Thus, the total length in the print direction can be made shorter. As a result, the quantity of use of the printing paper 71 can be reduced and thus the cost can be reduced.

Figure 10:
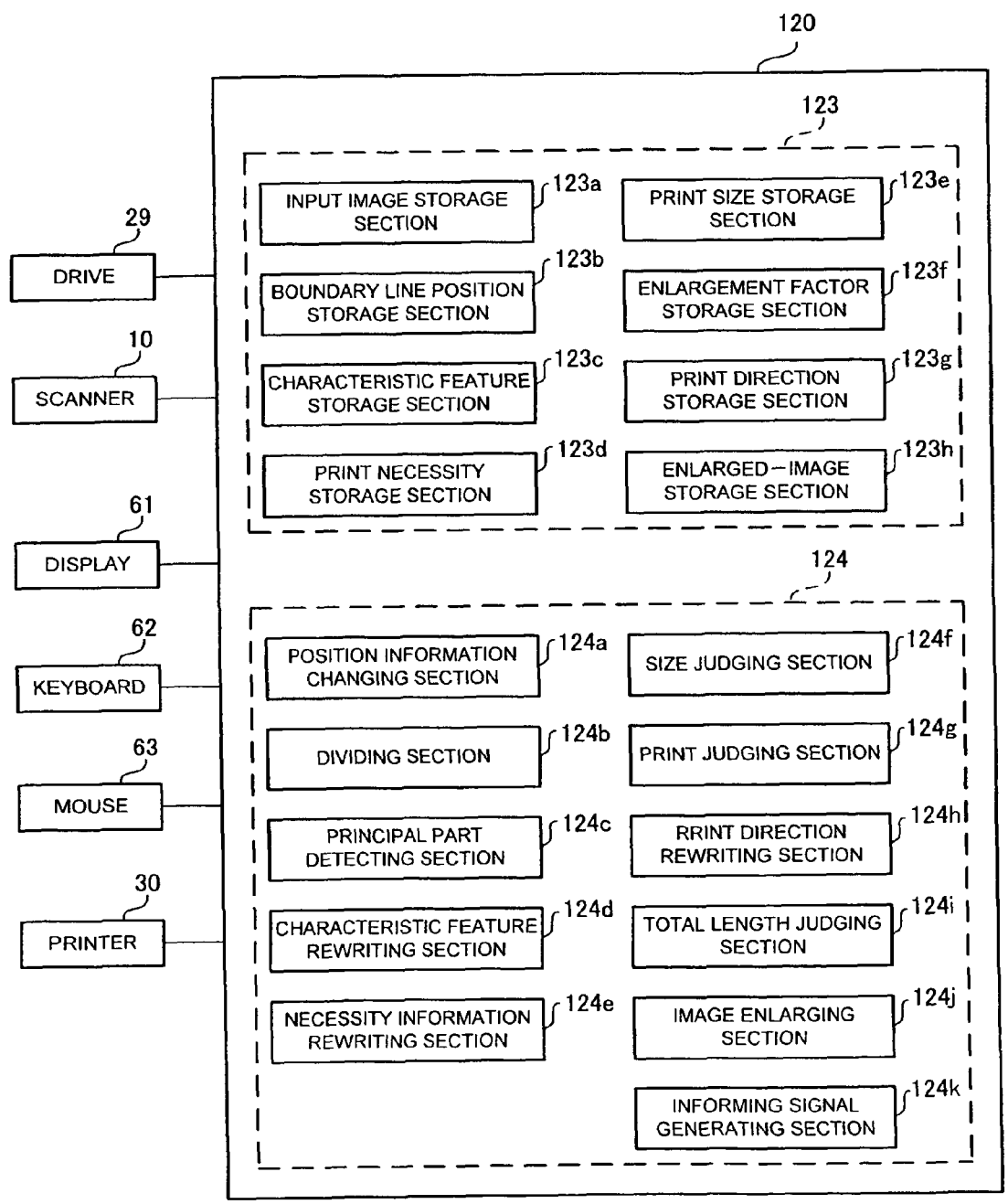
FIG. 10 is a block diagram showing a general constitution of a controller according to a second embodiment of the present invention.

Next, a photo processing apparatus including therein a controller as shown in FIG. 10 according to a second embodiment of the present invention will be described. The components of the photo processing apparatus of this embodiment other than the controller are the same as those of the photo processing apparatus 1 of the first embodiment. In this embodiment, therefore, the components other than the controller are denoted by the same reference numerals as those of the first embodiment.

The photo processing apparatus including therein a controller 120 according to this embodiment differs from the photo processing apparatus 1 of the first embodiment mainly in the following feature. In the controller 20 of the photo processing apparatus 1 of the first embodiment, when one or more boundary lines dividing an input image into a plurality of regions are across a principal part of the image, the position information changing section 24a changes the position information on boundary lines being stored in the boundary line position storage section 23b, such that any boundary line is not across the principal part. In addition, when a plurality of enlarged regions include one or more regions that exceed the maximum print size, the position information changing section 24a changes the position information on boundary lines being stored in the boundary line position storage section 23b, such that any region does not exceed the maximum print size. Contrastingly in the controller 120 of the photo processing apparatus of this embodiment, when one or more boundary lines are across a principal part of an input image or a plurality of enlarged regions include one or more regions that exceed the maximum print size, a position information changing section 124a changes the position information on boundary lines being stored in a boundary line position storage section 123b, on the basis of an instruction of an operator. The other features of the photo processing apparatus of this embodiment are the same as the photo processing apparatus 1 shown in FIG. 1, and thus the detailed description thereof will be omitted.

The controller 120 of this embodiment includes therein a storage unit 123 and a poster print control unit 124, like the controller 20 of the first embodiment. The storage unit 123 has the same constitution as the storage unit 23 of the first embodiment though the respective components of the storage unit 123 are denoted by reference numerals obtained by adding a hundred to the respective reference numerals of the corresponding components of the storage unit 23. The poster print control unit 124 includes therein a position information changing section 124a, a dividing section 124b, a principal part detecting section 124c, a characteristic feature rewriting section 124d, a necessity information rewriting section 124e, a size judging section 124f, a print judging section 124g, a print direction rewriting section 124h, a total length judging section 124i, and an image enlarging section 124j, like the poster print control unit 24 of the first embodiment. The poster print control unit 124 of this embodiment further includes therein an informing signal generating section 124k.

When a boundary line dividing an input image is across a principal part of the image or the above-described size judging section 124g has judged a region to exceed the maximum print size being stored in the print size storage section 123e, the informing signal generating section 124k generates an informing signal that causes the display screen 61a to display thereon a warning message to inform the operator of the above undesirable condition.

Figure 11A:
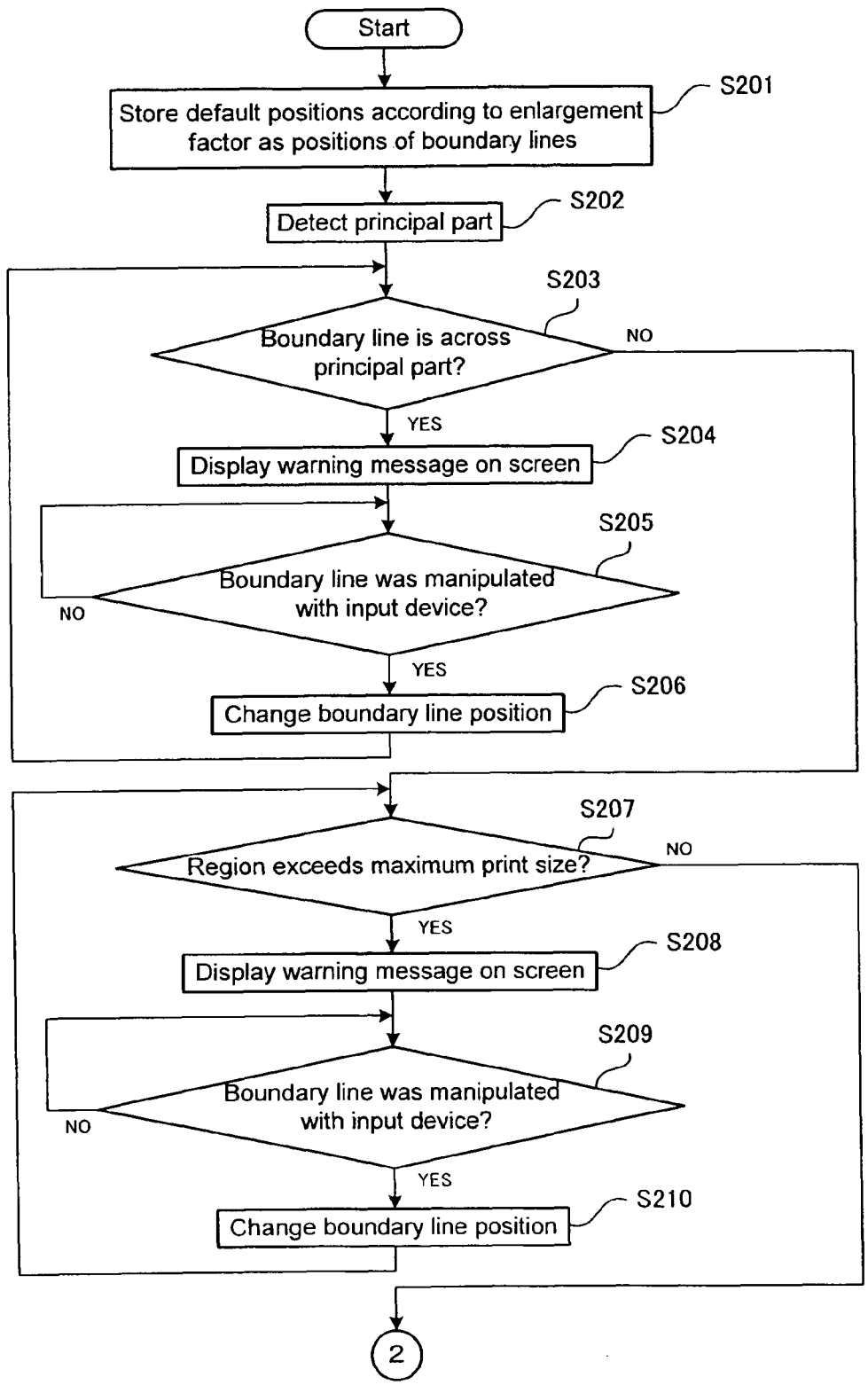
FIG. 11A is a flowchart showing the first half of a procedure of poster printing by the controller of FIG. 10.
Figure 11B:
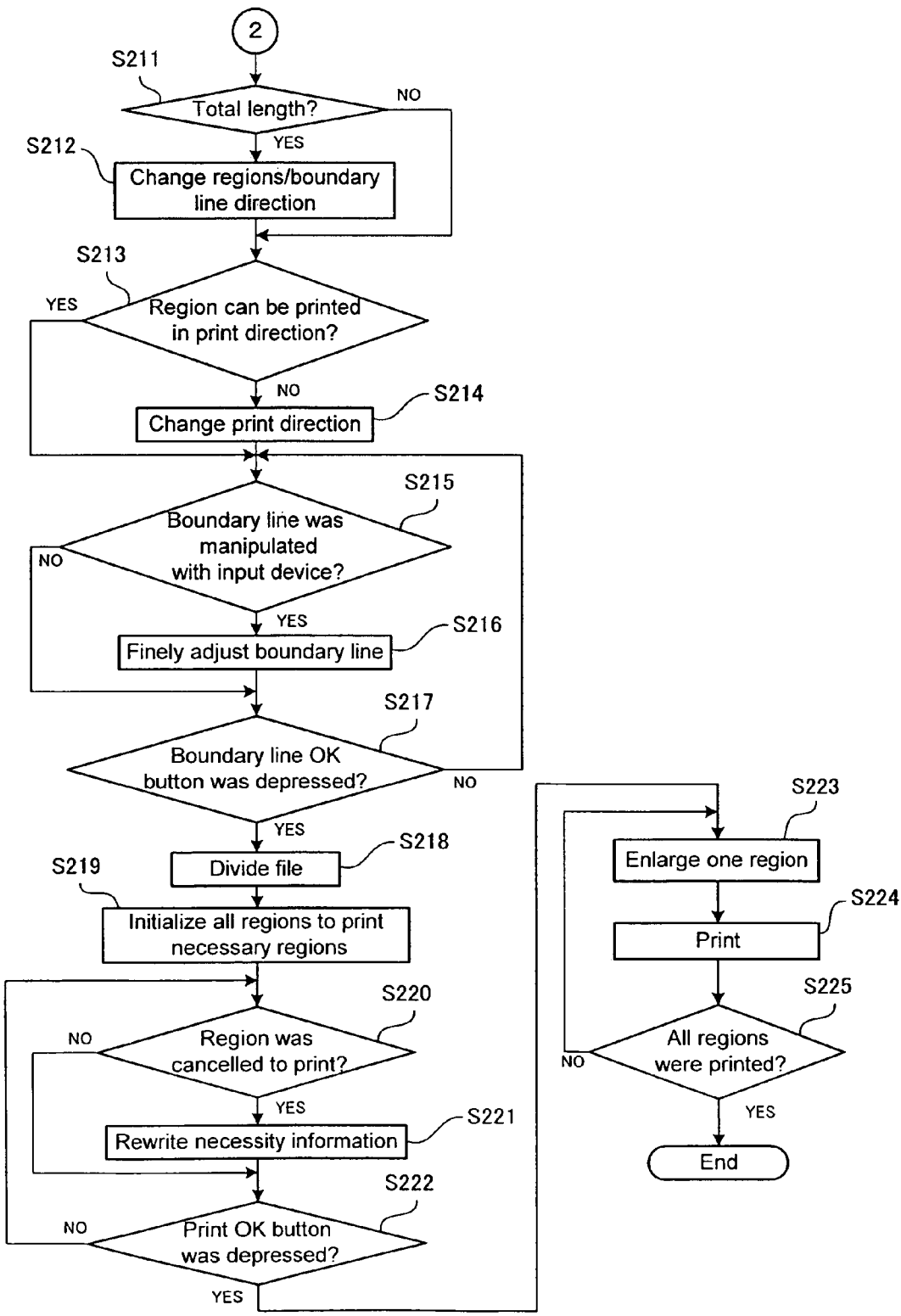
FIG. 11B is a flowchart showing the second half of the procedure of poster printing by the controller of FIG. 10.
Figure 12:
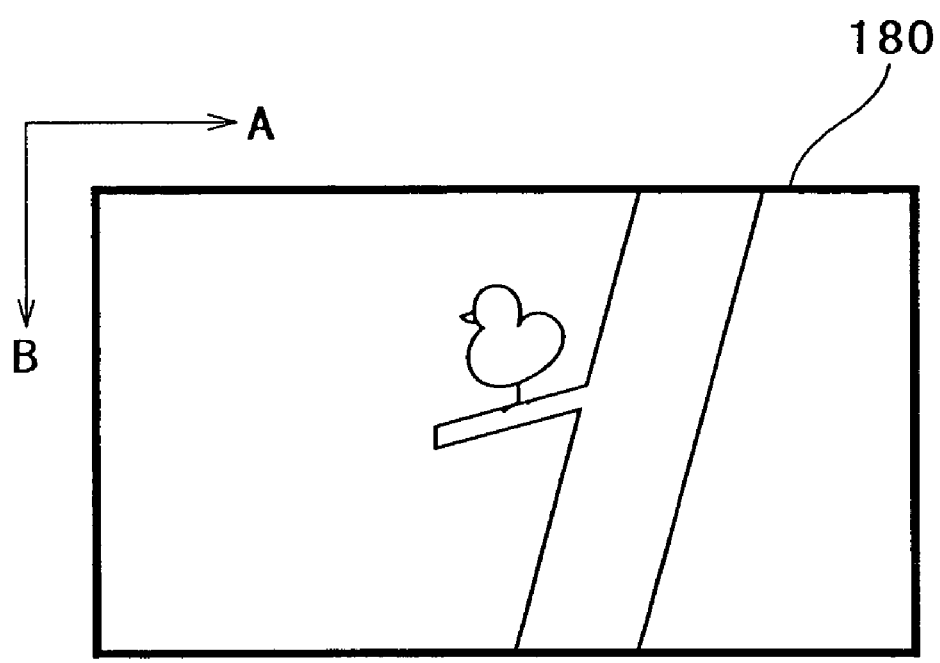
FIG. 12 shows an example of an image to be processed by a photo processing apparatus including therein the controller of FIG. 10.

Next, a procedure of poster printing in the photo processing apparatus of the second embodiment will be described. FIGS. 11A and 11B are flowcharts showing the procedure of poster printing. In this embodiment, a case will be described wherein an image 180 as shown in FIG. 12 according to an image data file supplied from the drive 29 or the scanner 10 and being stored in the input image storage section 123a is enlarged in accordance with the enlargement factor being stored in the enlargement factor storage section 123f, and then poster printing is carried out. The procedures of Steps S211 to S225 for poster printing according to this embodiment are substantially the same as the respective procedures of Steps S110 to S124 for poster printing according to the first embodiment.

A principal part of the image 180 of FIG. 12 is a bird. Thus, on the basis of an instruction to rewrite, input in advance by an operator, the characteristic features of human face and eyes stored in the characteristic feature storage section 123c have been rewritten to the characteristic feature of a bird. Also in this embodiment, like the first embodiment, a horizontal direction and a vertical direction in the image 180 shown in FIGS. 12 to 18 are referred to as the direction of an arrow A and the direction of an arrow B, respectively.

Figure 13:
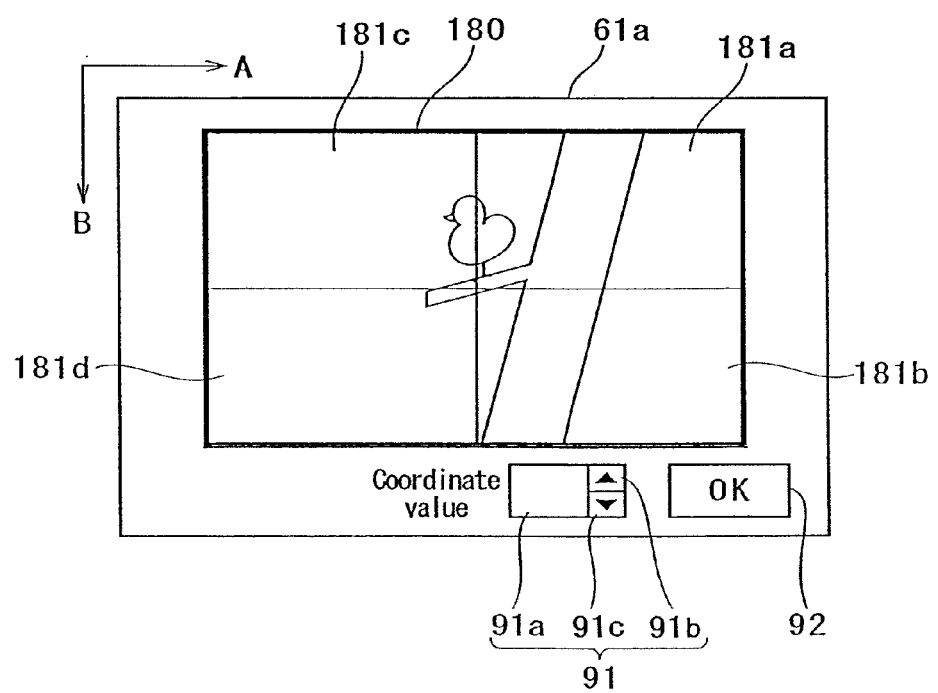
FIG. 13 shows a state wherein the image of FIG. 12 is divided by boundary lines being at their default positions, and the divided image is being displayed on a display screen.

First, in Step S201, the default positions according to the enlargement factor are stored in the boundary line position storage section 123b as position information on boundary lines. At this time, as shown in FIG. 13, the display screen 61a is displaying thereon the image 180 divided into four regions 181a to 181d corresponding to respective upper right, lower right, upper left, and lower left portions of the image; a coordinate change unit 91 including a coordinate display portion 91a, an increment button 91b for increasing a numerical value being displayed in the coordinate display portion 91a, and a decrement button 91c for decreasing a numerical value being displayed in the coordinate display portion 91a; and an OK button 92.

Figure 14:
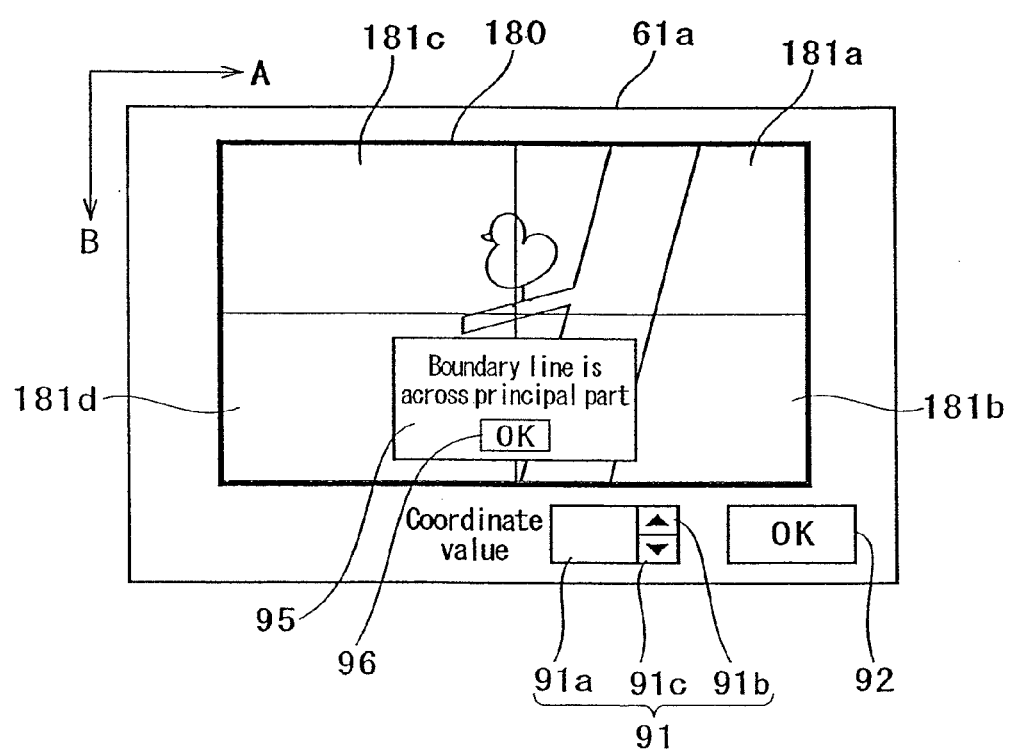
FIG. 14 shows a state wherein a warning message informing the operator that a boundary line on the image shown in FIG. 13 is across a principal part of the image, is being displayed on the display screen.

Next, in Step S202, the principal part detecting section 124c detects the position of a bird from the image 180 on the basis of the characteristic feature of a bird being stored in the characteristic feature storage section 123c. In step S203, it is judged whether or not a boundary line dividing the image 180 is across the bird detected in Step S202. When a boundary line is across the bird as shown in FIG. 13, that is, Yes in Step S203, a warning message informing the operator of that effect, and an OK button 96 are displayed on the display screen 61a in Step S204, as shown in FIG. 14.

The operator checks the warning message 95 on the display screen 61a and then depresses the OK button 96. The operator can change the position of the boundary line in question by dragging and moving the boundary line on the display screen 61a with the mouse 61a, or changing the numerical value being displayed in the coordinate display portion 91a. In the present example, the operator moves the boundary line between the regions 181a and 181c in the reverse direction to the direction of the arrow A as shown in FIG. 15 so that the boundary line is not across the bird.

Therefore, after Step S204, it is judged in Step S205 whether or not the operator has manipulated the position of a boundary line. When the operator has not manipulated the position of any boundary line, that is, No in Step S205, the judgment in Step S205 is repeated until a manipulation by the operator is detected. On the other hand, when the operator has manipulated the position of a boundary line, that is, Yes in Step S205, the position information changing section 124a then changes in Step S206 the position information on the boundary line being stored in the boundary line position storage section 123b, on the basis of the instruction of the operator. Afterward, the flow returns to Step S203, in which it is again judged whether or not a boundary line is across the bird.

Figure 15:
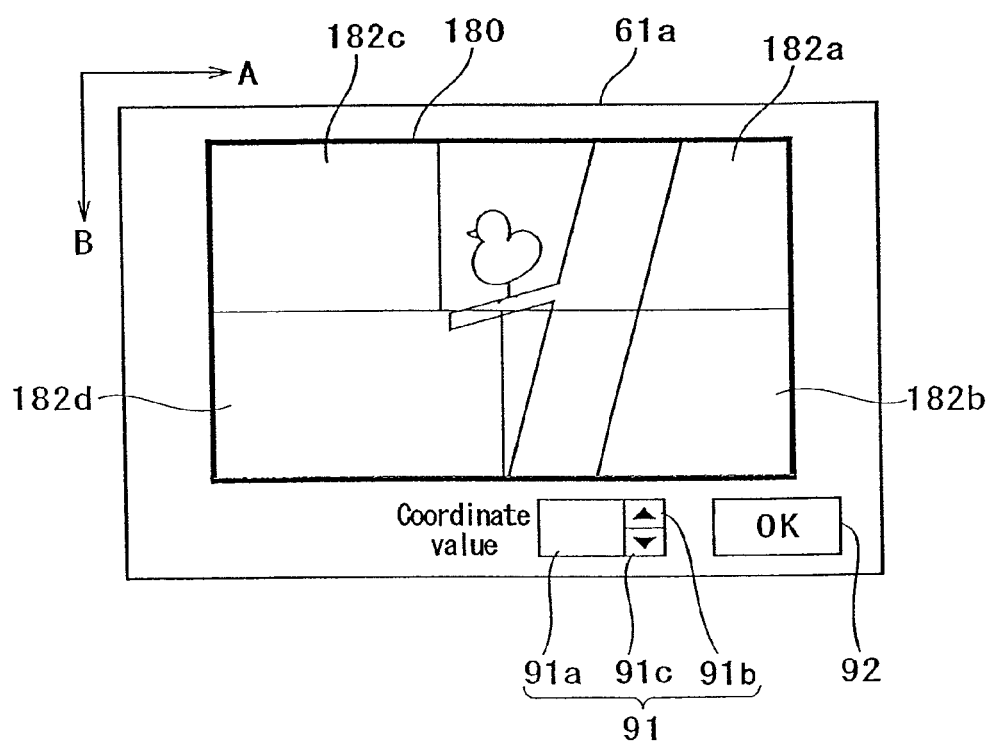
FIG. 15 shows a state wherein the positions of boundary lines for the image of FIG. 13 have been changed such that any boundary line is not across the principal part of the image.

When the image 180 is divided into four regions 182a to 182d as shown in FIG. 15 and any boundary line is not across the bird, that is, No in Step S203, the size judging section 124f then judged in Step S207 whether or not the enlarged size of each of the regions 182a to 182d on the basis of the enlargement factor being stored in the enlargement factor storage section 123f, exceeds the maximum print size.

Figure 16:
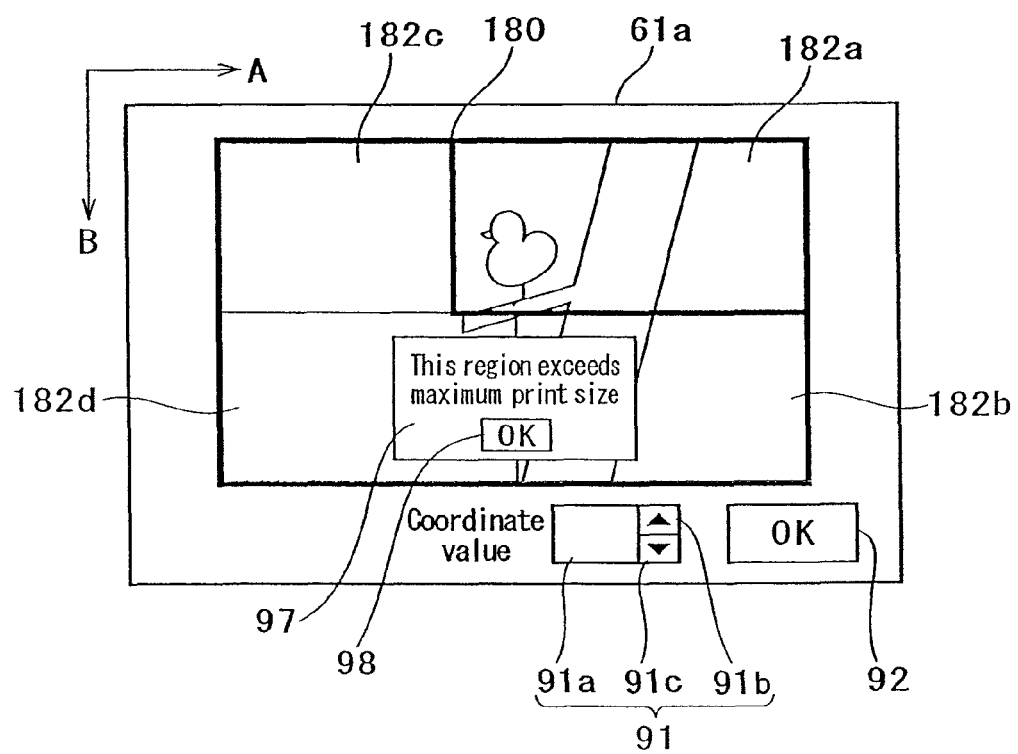
FIG. 16 shows a state wherein a warning message informing the operator that a plurality of regions of the image shown in FIG. 15 includes therein a region that exceeds the maximum print size, is being displayed on the display screen.

When a region is judged to exceed the maximum print size, that is, Yes in Step S207, the region 182a that exceeds the maximum print size is selected and a warning message 97 informing the operator of that effect, and an OK button 98 are displayed on the display screen 61a in Step S208, as shown in FIG. 16.

The operator checks the warning message 97 on the display screen 61a and then depresses the OK button 98. The operator can rearrange boundary lines with the mouse 63 or the keyboard 62. In the present example, the operator adds a new boundary line extending in the direction of the arrow B in the region 182a so as to further divide the region 182a into two regions each of which does not exceed the maximum print size. Consequently, as shown in FIG. 17, the image 180 is divided into five regions 183a to 183e corresponding to respective upper left, upper middle, upper right, lower left, and lower right portions of the image.

Therefore, after Step S208, it is judged in Step S209 whether or not the operator has manipulated the position of a boundary line. When the operator has manipulated the position of no boundary line, that is, No in Step S209, the judgment in Step S209 is repeated until a manipulation by the operator is detected. On the other hand, when the operator has manipulated the position of a boundary line, that is, Yes in Step S209, the position information changing section 124a then changes in Step S210 the position information on boundary lines being stored in the boundary line position storage section 123b, on the basis of the instruction of the operator. Afterward, the flow returns to Step S207, in which it is again judged whether or not each region exceeds the maximum print size.

When any of the regions 182a to 182d is judged not to exceed the maximum print size, that is, No in Step S207, the flow then skips Steps S208 to S210, and advances to Step S211. At this time, print direction information is stored in the print direction storage section 123g such that each of the regions 183a to 183e is printed in the direction of the arrow A.

Figure 17:
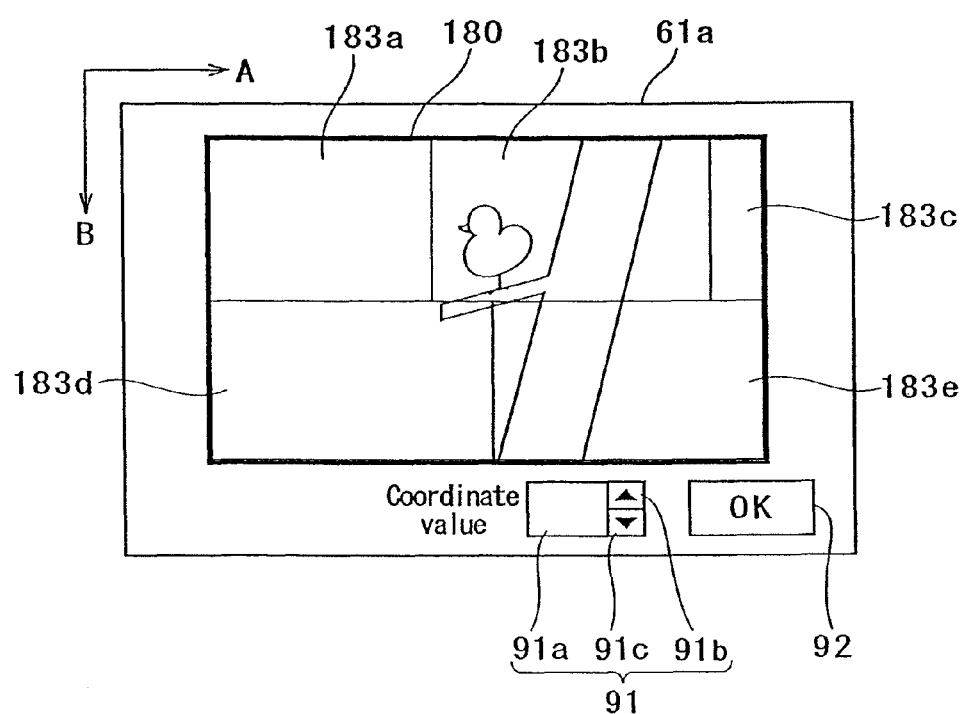
FIG. 17 shows a state wherein the positions of boundary lines for the image shown in FIG. 15 have been changed such that any region does not exceed the maximum print size.

Next, in Step S211, the total length judging section 124i judges whether or not the total length in the print direction in the case that the regions 183d and 183e neighboring each other and common in the print direction being stored in the above-described print direction storage section 123g, of the regions 183a, 183c, 183d, and 183e except the region 183b including therein the bird as a principal part, in five regions 183a to 183e of the image 180 shown in FIG. 17, are printed in the direction of the arrow A, is longer than the total length in the print direction in the case that regions 184d, 184e, 184f, and 184g neighboring each other in the direction of the arrow A, obtained by dividing the whole of two regions 183d and 183e by boundary lines extending in the direction of the arrow B perpendicular to the direction of the arrow A, are printed in the direction of the arrow B.

Figure 18:
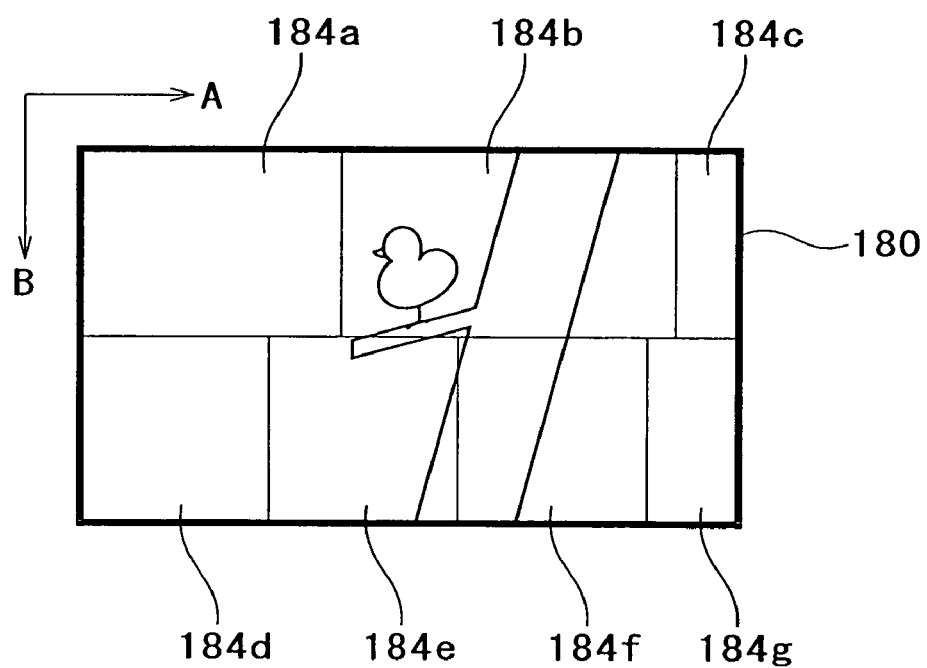
FIG. 18 shows a state wherein the regions of the image shown in FIG. 17 have been changed so that new regions have their total length in a print direction different from the total length of the original regions.

When the total length in the print direction in the case that the regions 183d and 183e as shown in FIG. 17 are printed in the direction of the arrow A, is not longer than the total length in the print direction in the case that the regions 184d to 184g as shown in FIG. 18 are printed in the direction of the arrow B, that is, No in Step S211, the flow then skips Step S212, which will be described below, and advances to Step S213. On the other hand, when the total length in the print direction in the case that the regions 183d and 183e as shown in FIG. 17 are printed in the direction of the arrow A, is longer than the total length in the print direction in the case that the regions 184d to 184g as shown in FIG. 18 are printed in the direction of the arrow B, that is, Yes in Step S211, the position information changing section 124a then changes in Step S212 the position information on boundary lines being stored in the boundary line position storage section 123b, to the state as shown in FIG. 18 so that the total length in the print direction becomes shorter. In addition, the print direction changing section 124h sets the print direction for the regions 184d to 184g to the direction of the arrow B.

In the present example, the total length in the print direction in the case that the regions 183d and 183e as shown in FIG. 17 are printed in the direction of the arrow A, is not longer than the total length in the print direction in the case that the regions 184d to 184g as shown in FIG. 18 are printed in the direction of the arrow B. Thus, Step S212 is skipped.

Next, in Step S213, the print judging section 124g judges whether or not each of five regions 183a to 183e of the image 180 as shown in FIG. 17 can be printed in the print direction being stored in the print direction storage section 123g. When any of the regions 183a to 183e can be printed in the print direction, that is, Yes in Step S213, the flow then skips Step S214, which will be described below, and advances to Step S215. On the other hand, when one or more of the regions 183a to 183e can not be printed in the print direction, that is, No in Step S213, the print direction rewriting section 124h then rewrites in Step S214 the print direction for the regions impossible to print, being stored in the print direction storage section 123g, to a direction perpendicular to the currently stored direction. In the present example, any of five regions 183a to 183e as shown in FIG. 17 can be printed in the originally stored direction, and thus Step S214 is skipped.

At this time, the operator who is checking the image 180 being displayed on the display screen 61a as shown in FIG. 17, can manipulate a boundary line with the keyboard 62 or the mouse 63 to finely adjust the position of the boundary line at need. Therefore, after Step S214, it is judged in Step S215 whether or not the operator has manipulated the position of a boundary line. When the operator has not manipulated the position of any boundary line, that is, No in Step S215, the flow then skips Step S216, which will be described below, and advances to Step S217. On the other hand, when the operator has manipulated the position of a boundary line, that is, Yes in Step S215, the position information changing section 124a then changes in Step S216 the position information on the boundary line being stored in the boundary line position storage section 123b, on the basis of the instruction of the operator.

Next, in Step S217, it is judged whether or not the operator has depressed the OK button 92 to determine the positions of the boundary lines dividing the image 180 being displayed on the display screen 61*a*. When the OK button 92 has not yet been depressed, that is, No in Step S217, the flow then returns to Step S215, in which it is again judged whether or not the operator has manipulated the position of a boundary line. On the other hand, when the OK button 92 has been depressed, that is, Yes in Step S217, the dividing section 124*b* then divides in Step S218 the image data file of the image 180 being stored in the input image storage section 123*a*, into five partial image data files corresponding to the respective regions 183*a* to 183*e* being displayed on the display screen 61*a*.

Next, in Step S219, print necessity information is stored in the print necessity storage section 123*d* such that all the above five partial image data files are printed. That is, all the regions 183*a* to 183*e* of the image 180 being displayed on the display screen 61*a* are set to necessary print regions. At this time, if the operator who is checking the image 180 being displayed on the display screen 61*a*, finds a region that need not be printed, he or she can input an instruction to cancel the printing operation for the region.

Therefore, after Step S219, it is judged in Step S220 whether or not the operator has cancelled the printing operation for a region unnecessary to print. When any region is judged not to have been cancelled to print, that is, No in Step S220, the flow then skips Step S221, which will be described below, and advances to Step S222. On the other hand, when a region is judged to have been cancelled to print, that is, Yes in Step S220, the necessity information rewriting section 124*e* then rewrites in Step S221 the print necessity information being stored in the print necessity storage section 123*d*, on the basis of the operator's instruction to cancel the printing operation, so that the partial image data file corresponding to the region that need not be printed is not printed. Afterward, in Step S222, it is judged whether or not the operator who selected all regions that need not be printed, has depressed a not-shown print OK button.

When the print OK button is judged not to have been depressed by the operator, that is, No in Step S222, the flow then returns to Step S220, in which it is again judged whether or not the operator has cancelled the printing operation for a region. On the other hand, when the print OK button is judged to have been depressed, that is, Yes in Step S222, the image enlarging section 124*j* then enlarges one region of the image in Step. S223. A partial image data file corresponding to the enlarged image of the region is then stored in the enlarged-image storage section 123*h*. Afterward, in Step S224, the printer 30 prints an image on the basis of the image data file being stored in the enlarged-image storage section 123*h*. Further, in Step S225, it is judged whether or not all the print necessary regions of the image 180 have been printed. When the printing operation is judged not to be completed for all the regions, that is, No in Step S225, the flow then returns to Step S223, in which a region that has not yet been printed is enlarged. On the other hand, when the printing operation is judged to be completed, that is, Yes in Step S225, the procedure of poster printing for the image 180 then ends.

As described above, the controller 120 according to this embodiment can bring about an easy-to-see image in poster printing, like the controller 20 of the first embodiment.

In the controller 120 of this embodiment, the position information changing section 124*a* changes the position information on boundary lines being stored in the boundary line position storage section 123*b*, on the basis of an instruction input by an operator. Therefore, an easy-to-see image that meets the operator's intention can be obtained in poster printing.

When a boundary line dividing the image 180 is across the bird as a principal part of the image, or when the above-described size judging section 124*f* judges a region to exceed the maximum print size being stored in the print size storage section 123*e*, the controller 120 of this embodiment generates an informing signal that causes the display screen 61*a* to display thereon a warning message to inform the operator of the undesirable condition. Thus, the operator can check the warning message being displayed on the display screen 61*a*, and can manipulate boundary lines.

In the above-described first and second embodiments, the controller includes therein a principal part detecting section for detecting a principal part of an image. However, such a principal part detecting section is not always required. For example, an operator checks by himself a principal part of an input image being displayed on the display screen, and changes the position information on boundary lines being stored in the boundary line position storage section, such that any boundary line is not across the principal part.

In the first embodiment, the characteristic features of human face and eyes have been stored in advance in the characteristic feature storage section 23*c* so that the face or eyes of a human can be detected as a principal part of an image. However, the present invention is not limited to that. For example, the characteristic feature of a human hand may have been stored in advance in the characteristic feature storage section 23*c* so that a hand of a human can be detected as a principal part of an image.

In the first and second embodiments, the controller includes therein a characteristic feature rewriting section for rewriting the characteristic feature of a principal part being stored in the characteristic feature storage section. However, such a characteristic feature rewriting section is not always required.

In the above-described first embodiment, after the position information changing section 24*a* changes the position information on boundary lines being stored in the boundary line position storage section 23*b*, such that any boundary line is not across a principal part of an image and any region of the image does not exceed the maximum print size, an operator can manipulate a boundary line or lines to finely adjust the position information on the boundary lines. However, the present invention is not limited to that. It is sufficient if such fine adjustment of the position information on boundary lines by the operator manipulating the boundary lines is impossible.

In the above-described first and second embodiments, the controller further includes a print necessity storage section for storing therein print necessity information on each of a plurality of partial image data files corresponding to a plurality of regions obtained by dividing an input image; and a necessity information rewriting section for rewriting the print necessity information being stored in the print necessity storage section, on the basis of an instruction to cancel a print operation, input by an operator. Thereby, only the regions necessary to print are printed. However, the present invention is not limited to that. In a modification, all regions may always be printed.

In the above-described first and second embodiments, the controller further includes a size judging section for judging whether or not a plurality of regions enlarged according to the enlargement factor being stored in the enlargement factor storage section, include a region that exceeds the maximum print size being stored in the print size storage section. However, such a size judging section is not always required.

In the above-described first and second embodiments, a wound long printing paper is used as a photosensitive material, and the maximum print size is determined by the width of the printing paper and the capacity of the enlarged-image storage section. However, the present invention is not limited to that. For example, a printing paper in a state of a sheet cut in advance may be used as a photosensitive material, and the maximum print size may be determined only by the size of the printing paper.

In the above-described second embodiment, the controller 120 further includes the informing signal generating section 124k. When a boundary line dividing the image 180 is across a principal part of the image, or when the size judging section 124f judges a region to exceed the maximum print size being stored in the print size storage section 123e, the informing signal generating section 124k generates an informing signal that causes the display screen 61a to display thereon a warning message to inform the operator of the above undesirable condition. However, the present invention is not limited to that. Such an informing signal generating section 124k is not always required.

In the above-described first and second embodiments, when the size judging section 124f judges one or more regions to exceed the maximum print size, the position information on boundary lines is changed so that any region does not exceed the maximum print size. However, the present invention is not limited to that. In a modification, the position information on boundary-lines may not be changed even when one or more regions exceed the maximum print size.

In the above-described first and second embodiments, the controller further includes therein a print judging section for judging whether or not each of a plurality of regions can be printed in the print direction being stored in the print direction storage section. However, such a print judging section is not always required.

In the above-described first and second embodiments, regions are changed so that a shorter total length of regions in the print direction can be obtained. However, the present invention is not limited to that. In a modification, such a change of regions to reduce the total length in the print direction may not be performed.

In the above-described first and second embodiments, an image data file is divided into a plurality of partial image data files. However, a thing to be divided is not limited to such an image data file. For example, an aggregate of data constituting image information before converted into a file may be used.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. An image processing apparatus comprising:
   a boundary line position storage section that stores therein position information on boundary lines for dividing an image according to an image data unit into a plurality of regions;
   a position information changing section that changes the position information on boundary lines being stored in the boundary line position storage section, such that the position of a boundary line is changed in the image;
   a dividing section that divides the image data unit into a plurality of partial image data units corresponding to the respective regions,
   wherein the position information changing section includes a selecting section that selects a part of the boundary lines which divides into at least two regions neighboring to each other as a target boundary line, and a target boundary line position changing section that changes only position information on the target boundary line so that the at least two regions neighboring to each other and divided by the target boundary line are both changed in shape;
   wherein the apparatus further comprises:
   a print direction storage section that stores therein a print direction for each of the plurality of regions;
   a print direction rewriting section that rewrites a print direction being stored in the print direction storage section; and
   a total length judging section that judges which of the following cases brings about the shorter total length in the print direction: a case wherein a plurality of first neighboring regions in the plurality of regions, neighboring each other and common in the print direction being stored in the print direction storage section, are printed in the print direction of the first neighboring regions; and a case wherein a plurality of second neighboring regions obtained by dividing the whole of the plurality of first neighboring regions by a boundary line or lines perpendicular to the print direction being stored in the print direction storage section for the first neighboring regions, are printed in a direction perpendicular to the print direction being stored in the print direction storage section for the first neighboring regions, and
   when the total length judging section judges the case wherein the plurality of second neighboring regions are printed in the direction perpendicular to the print direction being stored in the print direction storage section for the first neighboring regions, to bring about the shorter total length, the position information changing section changes the position information on boundary lines being stored in the boundary line position storage section, such that the plurality of second neighboring regions are formed in place of the plurality of first neighboring regions; and the print direction rewriting section sets the print direction for the plurality of second neighboring regions to a direction perpendicular to the print direction being stored in the print direction storage section for the first neighboring regions.

2. The apparatus according to claim 1, wherein the apparatus further comprises a principal part detecting section that detects a principal part of the image according to the image data unit, and
   the position information changing section changes the position information on boundary lines being stored in the boundary line position storage section, such that any boundary line is not across the principal part detected by the principal part detecting section.

3. The apparatus according to claim 2, wherein the principal part detecting section detects a human face as the principal part of the image.

4. The apparatus according to claim 2, wherein the principal part detecting section detects human eyes as the principal part of the image.

5. The apparatus according to claim 2, further comprising:
   a characteristic feature storage section that stores therein a characteristic feature of the principal part of the image according to the image data unit; and a characteristic feature rewriting section that rewrites the characteristic feature being stored in the characteristic feature storage section, on the basis of a signal from an input device.

6. The apparatus according to claim 2, wherein the position information changing section finely adjusts the position information on a boundary line being stored in the boundary line position storage section, on the basis of a signal from an input device.

7. The apparatus according to claim 1, wherein the position information changing section changes the position information on boundary lines being stored in the boundary line position storage section, on the basis of a signal from an input device.

8. The apparatus according to claim 1, further comprising:
a print necessity storage section that stores therein print necessity information on each of the plurality of partial image data units obtained by the dividing section dividing the image data unit; and
a necessity information rewriting section that rewrites the print necessity information being stored in the print necessity storage section, on the basis of a signal from an input device.

9. The apparatus according to claim 1, further comprising:
a print size storage section that stores therein a maximum print size for the image;
an enlargement factor storage section that stores therein an enlargement factor for the image; and
a size judging section that judges on the basis of the enlargement factor being stored in the enlargement factor storage section, whether or not the plurality of regions include a region that exceeds the maximum print size being stored in the print size storage section.

10. The apparatus according to claim 9, wherein the print size storage section stores therein a size of a paper on which the image is to be printed.

11. The apparatus according to claim 9, further comprising an informing signal generating section that generates an informing signal to inform an operator that a region exceeds the maximum print size being stored in the print size storage section, when the size judging section judges the region to exceed the maximum print size.

12. The apparatus according to claim 9, wherein the position information changing section changes the position information on boundary lines being stored in the boundary line position storage section, such that any region does not exceed the maximum print size being stored in the print size storage section, when the size judging section judges one or more regions to exceed the maximum print size.

13. An image processing apparatus comprising:
a boundary line position storage section that stores therein position information on boundary lines for dividing an image according to an image data unit into a plurality of regions;
a position information changing section that changes the position information on boundary lines being stored in the boundary line position storage section, such that the position of a boundary line is changed in the image;
a dividing section that divides the image data unit into a plurality of partial image data units corresponding to the respective regions;
a print size storage section that stores therein a maximum print size for the image;
an enlargement factor storage section that stores therein an enlargement factor for the image; and
a size judging section that judges on the basis of the enlargement factor being stored in the enlargement factor storage section, whether or not the plurality of regions include a region that exceeds the maximum print size being stored in the print size storage section;
wherein the position information changing section includes a selecting section that selects a part of the boundary lines which divides into at least two regions neighboring to each other as a target boundary line, and a target boundary line position changing section that changes only position information on the target boundary line; and
wherein the apparatus further comprises:
a print direction storage section that stores therein a print direction for each of the plurality of regions;
a print direction rewriting section that rewrites a print direction being stored in the print direction storage section; and
a total length judging section that judges which of the following cases brings about the shorter total length in the print direction: a case wherein a plurality of first neighboring regions in the plurality of regions, neighboring each other and common in the print direction being stored in the print direction storage section, are printed in the print direction of the first neighboring regions; and a case wherein a plurality of second neighboring regions obtained by dividing the whole of the plurality of first neighboring regions by a boundary line or lines perpendicular to the print direction being stored in the print direction storage section for the first neighboring regions, are printed in a direction perpendicular to the print direction being stored in the print direction storage section for the first neighboring regions, and
when the total length judging section judges the case wherein the plurality of second neighboring regions are printed in the direction perpendicular to the print direction being stored in the print direction storage section for the first neighboring regions, to bring about the shorter total length, the position information changing section changes the position information on boundary lines being stored in the boundary line position storage section, such that the plurality of second neighboring regions are formed in place of the plurality of first neighboring regions; and the print direction rewriting section sets the print direction for the plurality of second neighboring regions to a direction perpendicular to the print direction being stored in the print direction storage section for the first neighboring regions.

* * * * *